US008090411B2

(12) United States Patent
Korevaar et al.

(10) Patent No.: US 8,090,411 B2
(45) Date of Patent: Jan. 3, 2012

(54) WIRELESS MILLIMETER WAVE COMMUNICATION SYSTEM

(75) Inventors: Eric Korevaar, La Jolla, CA (US); Eduardo Tinoco, Surprise, AZ (US); Richard Chedester, Whately, MA (US); Vladimar Kolinko, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 995 days.

(21) Appl. No.: 12/004,587

(22) Filed: Dec. 24, 2007

(65) Prior Publication Data

US 2008/0153549 A1 Jun. 26, 2008

Related U.S. Application Data

(63) Continuation-in-part of application No. 11/249,787, filed on Jan. 6, 2006, which is a continuation-in-part of application No. 10/799,225, filed on Mar. 12, 2004, now Pat. No. 7,062,293, which is a continuation-in-part of application No. 09/952,591, filed on Sep. 14, 2001, now Pat. No. 6,714,800, and a continuation-in-part of application No. 09/847,629, filed on May 2, 2001, now Pat. No. 6,556,836, said application No. 09/882,482.

(60) Provisional application No. 60/876,916, filed on Dec. 22, 2006.

(51) Int. Cl.
*H04M 1/00* (2006.01)

(52) U.S. Cl. ............. 455/561; 455/41.2; 455/8; 455/10; 455/25; 455/73; 455/505; 455/67.15; 455/562.1; 455/504; 455/506; 455/445

(58) Field of Classification Search ................ 455/8, 10, 455/25, 73, 41.2, 505, 67.15, 561, 562.1, 455/504, 506, 445
See application file for complete search history.

(56) References Cited

U.S. PATENT DOCUMENTS

| | | | | |
|---|---|---|---|---|
| 4,460,897 | A * | 7/1984 | Gans | 343/754 |
| 5,488,333 | A * | 1/1996 | Vig | 331/66 |
| 5,789,750 | A * | 8/1998 | Nuss | 250/338.1 |
| 6,348,986 | B1 * | 2/2002 | Doucet et al. | 398/128 |
| 6,684,058 | B1 * | 1/2004 | Karacaoglu et al. | 455/20 |

* cited by examiner

*Primary Examiner* — Patrick Edouard
*Assistant Examiner* — Shantell L Heiber
(74) *Attorney, Agent, or Firm* — John R. Ross

(57) ABSTRACT

A lens-based millimeter wave transceiver for use in wireless communication systems operating in the E-band spectrum consistent with the FCC rules regulating the 71-76 GHz and 81-86 GHz bands. The transceiver includes a single lens adapted for transmission of millimeter radiation to form communication beams in one band of either a band of about 71-76 GHz or a band of 81-86 GHz and for collection and focusing of millimeter wave radiation from communication beams in the other of the two bands. It includes a feed horn adapted to broadcast millimeter radiation through said single lens and to collect incoming millimeter wave radiation collected and focused by said single lens. A millimeter wave diplexer separates incoming and outgoing millimeter wave radiation.

8 Claims, 26 Drawing Sheets

LOEA 1000 BLOCK DIAGRAM

LOCAL OSCILLATOR FREQUENCIES:

STATION 1 = 81.344 GHz
STATION 2 = 81.426 GHz
STATION 3 = 81.508 GHz

STATION 31 = 83.804 GHz
STATION 32 = 83.886 GHz

PolyMethylPentene Plano-Convex Lens R=179.514 mm,
cc = -.5814, n = 1.46, t = 20 mm, bfl = 356 mm a) 5 inches b) 6 inches c) 7 inches d) 8 inches e) 9 inches f) 10 inches Antenna sidelobes (dB) vs. angle (degrees). Lens diameter 9.85 inches, frequency 73.5 GHz, Beam Diameter on lens (1/e power point) as given. Stepped curve FCC requirements. Dotted curve uniform illumination. Solid curve as predicted for Gaussian illumination.

a) 6 inches b) 9 inches

Antenna sidelobes (dB) vs. angle (degrees). Lens diameter 9.85 inches, frequency 83.5 GHz, Beam Diameter on lens (1/e power point) as given. Stepped curve FCC requirements. Dotted curve uniform illumination. Solid curve as predicted for Gaussian illumination.

a) 73.5 GHz b) 83.5 GHz

WIRELESS MILLIMETER WAVE COMMUNICATION SYSTEM

The present invention relates to communication systems with wireless communication links and specifically to high data rate point-to-point links. This application is a continuation-in-part application of Ser. No. 11/249,787 and Ser. No. 11/327,816 filed Jan. 6, 2006, the latter two of which are continuations in part of Ser. No. 10/799,225 filed Mar. 12, 2004, now U.S. Pat. No. 7,062,293, which was a continuation-in-part of Ser. No. 09/952,591 filed Sep. 14, 2001, now U.S. Pat. No. 6,714,800 that in turn was a continuation-in-part of Ser. No. 09/847,629 filed May 2, 2001 now U.S. Pat. No. 6,556,836, and Ser. No. 09/882,482 filed Jun. 14, 2001 now U.S. Pat. No. 6,665,546. This application also claims the benefit of Provisional Application Ser. No. 60/876,916 filed Dec. 22, 2006.

BACKGROUND OF THE INVENTION

Local Wireless Radio Communication

Local wireless communication services represent a very rapidly growing industry. These services include paging and cellular telephone services and wireless internet services such as WiFi and WiMax. WiFi refers to communication systems designed for operation in accordance with IEEE 802.11 standards and WiMax refers to systems designed to operate in accordance with IEEE 802.16 standards. Communication under these standards is typically in unlicensed portions of the 2-11 GHz spectral range although the original IEEE 802.16 standard specifies the 10-66 GHz range. Use of these WiFi bands does not require a license in most parts of the world provided that the output of the system is less than 100 milliwatts, but the user must accept interferences from other users of the system. Additional up-to-date descriptions of these WiFi and WiMax systems are available on the Internet from sources such as Google.

The cellular telephone industry currently is in its second generation with several types of cellular telephone systems being promoted. The cellular market in the United States grew from about 2 million subscribers and $2 billion in revenue in 1988 to more than 60 million subscribers and about $30 billion in revenue in 1998 and the growth is continuing in the United States and also around the world as the services become more available and prices decrease. Wireless computer networking and internet connectivity services are also growing at a rapid rate.

FIG. 1 describes a typical cellular telephone system. A cellular service provider divides its territory up into hexagonal cells as shown in FIG. 1. These cells may be about 5 miles across, although in densely populated regions with many users these cells may be broken up into much smaller cells called micro cells. This is done because cellular providers are allocated only a limited portion of the radio spectrum. For example, one spectral range allocated for cellular communication is the spectral range: 824 MHz to 901 MHz. (Another spectral range allocated to cellular service is 1.8 GHz to 1.9 GHz) A provider operating in the 824-901 MHz range may set up its system for the cellular stations to transmit in the 824 MHz to 851 MHz range and to receive in the 869 MHz to 901 MHz range. The transmitters both at the cellular stations and in devices used by subscribers operate at very low power (just a few Watts) so signals generated in a cell do not provide interference in any other cells beyond immediate adjacent cells. By breaking its allocated transmitting spectrum and receive spectrum in seven parts (A-G) with the hexagonal cell pattern, a service provider can set up its system so that there is a two-cell separation between the same frequencies for transmit or receive, as shown in FIG. 1. A one-cell separation can be provided by breaking the spectrum into three parts. Therefore, these three or seven spectral ranges can be used over and over again throughout the territory of the cellular service provider. In a typical cellular system each cell (with a transmit bandwidth and a receive bandwidth each at about 12 MHz wide) can handle as many as about 1200 two-way telephone communications within the cell simultaneously. With lower quality communication, up to about 9000 calls can be handled in the 12 MHz bandwidth. Several different techniques are widely used in the industry to divide up the spectrum within a given cell. These techniques include analog and digital transmission and several techniques for multiplexing the digital signals. These techniques are discussed at pages 313 to 316 in The Essential Guide to Telecommunications, Second Edition, published by Prentice Hall and many other sources. Third generation cellular communication systems promise substantial improvements with more efficient use of the communication spectra.

Other Prior Art Wireless Communication

Techniques for Point-to-Point and Point-to-Multi-Point

Most wireless communication, at least in terms of data transmitted, is one way, point-to-multi-point, which includes commercial radio and television. However, there are many examples of point-to-point wireless communication. Cellular telephone systems, discussed above, are examples of low-data-rate, point-to-point communication. Microwave transmitters on telephone system trunk lines are another example of prior art, point-to-point wireless communication at much higher data rates. The prior art includes a few examples of point-to-point laser communication at infrared and visible wavelengths.

Information Transmission

Analog techniques for transmission of information are still widely used; however, there has recently been extensive conversion to digital, and in the foreseeable future transmission of information will be mostly digital with volume measured in bits per second. To transmit a typical telephone conversation digitally utilizes about 5,000 bits per second (5 Kbits per second). Typical personal computer modems connected to the Internet operate at, for example, 56 Kbits per second. Music can be transmitted point to point in real time with good quality using MP3 technology at digital data rates of 64 Kbits per second. Video can be transmitted in real time at data rates of about 5 million bits per second (5 Mbits per second). Broadcast quality video is typically at 45 or 90 Mbps. Companies (such as line telephone, cellular telephone and cable companies) providing point-to-point communication services build trunk lines to serve as parts of communication links for their point-to-point customers. These trunk lines typically carry hundreds or thousands of messages simultaneously using multiplexing techniques. Thus, high volume trunk lines must be able to transmit in the gigabit (billion bits, Gbits, per second) range. Most modern trunk lines utilize fiber optic lines. A typical fiber optic line can carry about 2 to 10 Gbits per second and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line.

Very high data rate communication trunk lines, such as optical fiber trunk lines or high data rate cable communication systems, currently provide very broad geographical coverage and they are expanding rapidly throughout the world, but they do not go everywhere. Access points to the existing high data rate trunk lines are called "points of presence". These points of presence are physical locations that house servers, routers, ATM switches and digital/analog call aggregators. For Internet systems, these locations may be the service provider's own equipment or part of the facilities of a telecommunications provider that an Internet service provider rents.

Digital microwave communication has been available since the mid-1970's. Service in the 18-23 GHz radio spectrum is called "short-haul microwave" providing point-to-point service operating between 2 and 7 miles and supporting between four to eight T1 links (each carrying data at 1.544 Mbps). Recently, microwave systems operating in the 11 to 38 Ghz band have been designed to transmit at rates up to 155 Mbps (which is a standard transmit frequency known as "OC-3 Standard") using high order modulation schemes.

Data Rate and Frequency

Bandwidth-efficient modulation schemes allow, as a general rule, transmission of data at rates of about 1 to 8 bits per second per Hz of available bandwidth in spectral ranges including radio wave lengths to microwave wavelengths. Data transmission requirements of 1 to tens of Gbps thus would require hundreds of MHz of available bandwidth for transmission. Equitable sharing of the frequency spectrum between radio, television, telephone, emergency services, military, and other services typically limits specific frequency band allocations to about 10% fractional bandwidth (i.e., range of frequencies equal to about 10% of center frequency). AM radio, at almost 100% fractional bandwidth (550 to 1650 KHz) is an anomaly; FM radio, at 20% fractional bandwidth, is also atypical compared to more recent frequency allocations, which rarely exceed 10% fractional bandwidth.

Reliability Requirements

Reliability typically required for trunkline wireless data transmission is very high, consistent with that required for hard-wired links including fiber optics. Typical specifications for error rates are less than one bit in ten billion ($10^{-10}$ bit-error rate), and link availability of 99.999% (5 minutes of down time per year). This necessitates all-weather link operability, in fog and snow, and at rain rates up to 100 mm/hour in many areas. On the other, hand cellular telephone systems and wireless internet access systems do not require such high reliability. As a matter of fact cellular users (especially mobile users) are accustomed to poor service in many regions.

Weather Conditions

In conjunction with the above availability requirements, weather-related attenuation limits the useful range of wireless data transmission at all wavelengths shorter than the very long radio waves. Typical ranges in a heavy rainstorm for optical links (i.e., laser communication links) are 100 meters, and for microwave links, 10,000 meters.

Atmospheric attenuation of electromagnetic radiation increases generally with frequency in the microwave and millimeter-wave bands. However, excitation of rotational modes in oxygen and water vapor molecules absorbs radiation preferentially in bands near 60 and 118 GHz (oxygen) and near 23 and 183 GHz (water vapor). Rain attenuation, which is caused by large-angle scattering, increases monotonically with frequency from 3 to nearly 200 GHz. At the higher, millimeter-wave frequencies, (i.e., 30 GHz to 300 GHz corresponding to wavelengths of 1.0 centimeter to 1.0 millimeter) where available bandwidth is highest, rain attenuation in very bad weather limits reliable wireless link performance to distances of 1 mile or less. At microwave frequencies near and below 10 GHz, link distances to 10 miles can be achieved even in heavy rain with high reliability, but the available bandwidth is much lower.

Setting-Up Additional Cells in a Telephone System is Expensive

The cost associated with setting up an additional cell in a new location or creating a micro cell within an existing cell with prior art techniques is in the range of about $650,000 to $800,000. (See page 895 Voice and Data Communication Handbook, Fourth Edition, published by McGraw Hill.) These costs must be recovered from users of the cellular system. People in the past have avoided use of their cellular equipment because the cost was higher that their line telephones. Recently, costs have become comparable.

E-Band

In 2005 the United States Federal Communication Commission set aside a portion of the radio communication spectrum for regulated narrow beam millimeter wave communication. A small fee is paid to the FCC for a license to communicate in a narrow channel between two GPS points. The reserved frequency bands lies in the frequency ranges from 71 to 76 gigahertz (GHz), 81 to 86 GHz and 92 to 95 GHz. These reserved bands are referred to as "E-Band" frequencies. It is being used for short range, high bandwidth communications.

The Need

Therefore, a great need exists for techniques for quickly and inexpensively adding, at low cost, additional cells in cellular communication systems and additional wireless Internet access points and other wireless access points.

SUMMARY OF THE INVENTION

The present invention provides a lens-based millimeter wave transceiver for use in wireless communication systems operating in the E-band spectrum consistent with the FCC rules regulating the 71-76 GHz and 81-86 GHz bands. The transceiver includes a single lens adapted for transmission of millimeter radiation to form communication beams in one band of either a band of about 71-76 GHz or a band of 81-86 GHz and for collection and focusing of millimeter wave radiation from communication beams in the other of the two bands. It includes a feed horn adapted to broadcast millimeter radiation through said single lens and to collect incoming millimeter wave radiation collected and focused by said single lens. A millimeter wave diplexer separates incoming and outgoing millimeter wave radiation.

The transceiver is designed for use in wireless communication systems operating in the E-band spectrum consistent with the FCC rules regulating the 71-76 GHz and 81-86 GHz bands. The radio uses a single aperture to transmit radiation in one of the two bands, and receive radiation in the other of the bands. The counterpart radio used to form a link is almost identical, except for the interchange of transmit and receive frequencies. Preferred embodiments the size of the transceivers are minimized and the divergence of the beams are maximized within the restrictions of the FCC regulations. The carefully controlled divergence helps to minimize any adverse effects of tower sway on beam pointing.

In preferred embodiments the lenses are smaller than 10 inches in diameter. The feed horn is a pyramidal horn and is designed to provide approximately even illumination in both the horizontal and vertical plane, simultaneously, at both the 71-76 and 81-86 GHz bands.

DETAILED DESCRIPTION OF PREFERRED EMBODIMENTS

E-Band Millimeter Wave Communication

United States Federal Communication Commission (FCC) regulations define a minimum 3 dB divergence angle of 1.2 degrees, a minimum antenna gain of G=43 dBi, side lobe reduction between 1.2 degrees and 5 degrees of G-28, and side lobe reduction of 35 dB between 5 and 10 degrees off axis. (There are further side lobe reduction requirements at larger angles).

Lens-Based Transceiver

Figure 8A:
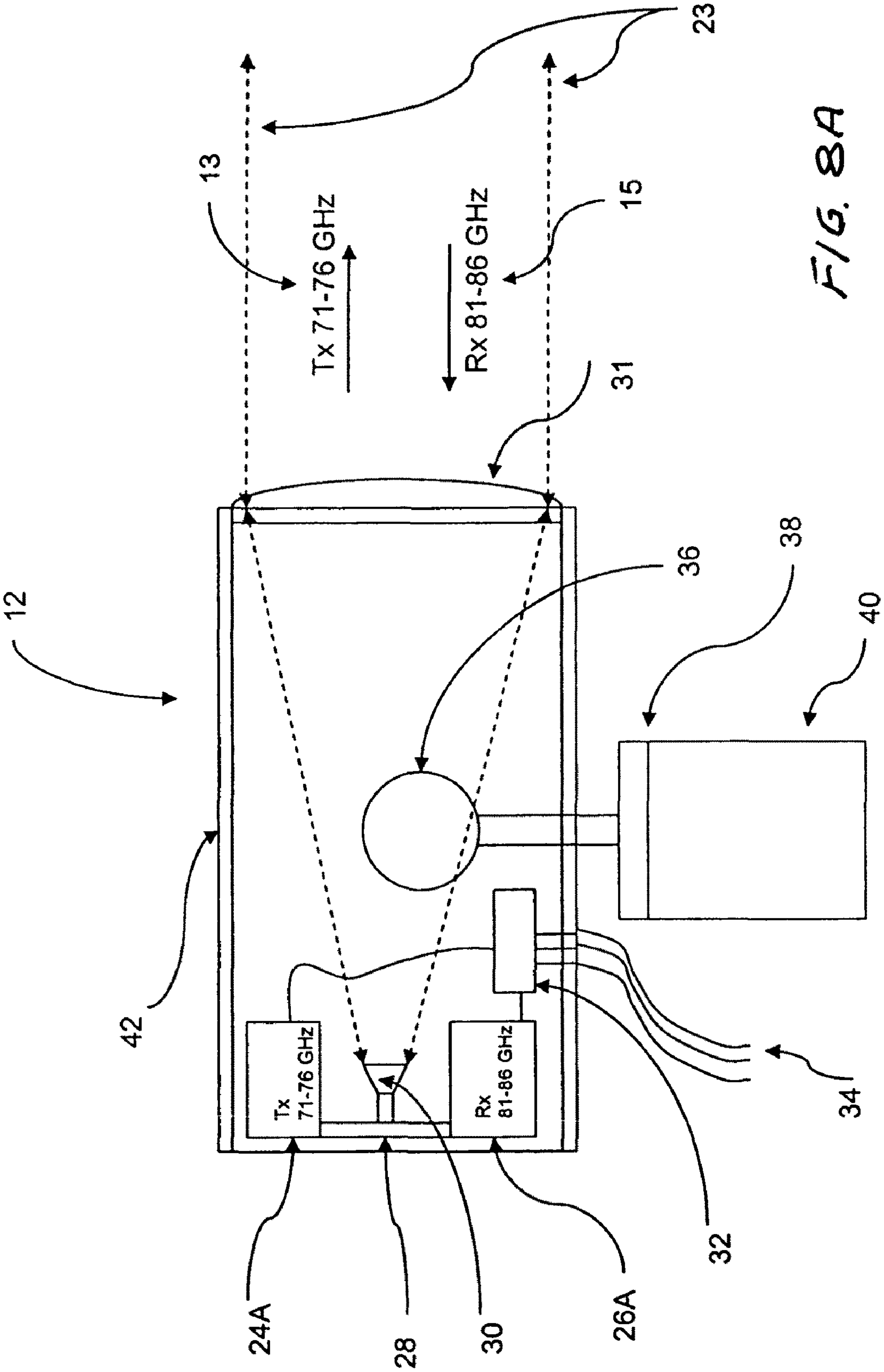
FIG. 8A is drawing of a lens-based millimeter wave transceiver for transmitting at 71-76 GHz and receiving at 81-86 GHz.
Figure 8B:
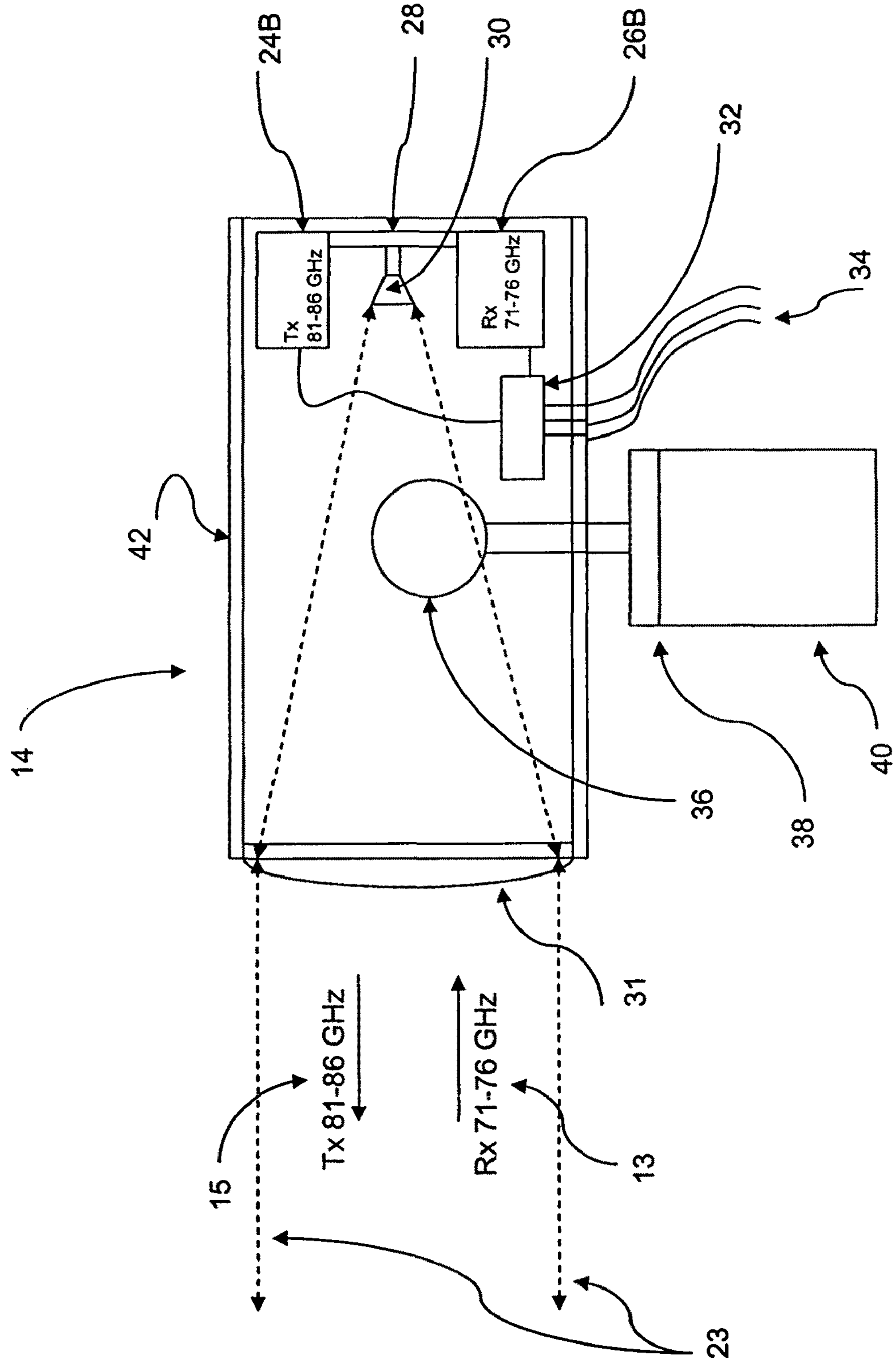
FIG. 8B is drawing of a lens-based millimeter wave transceiver for transmitting at 81-86 GHz and receiving at GHz 71-76.
Figures 9A, 9B:
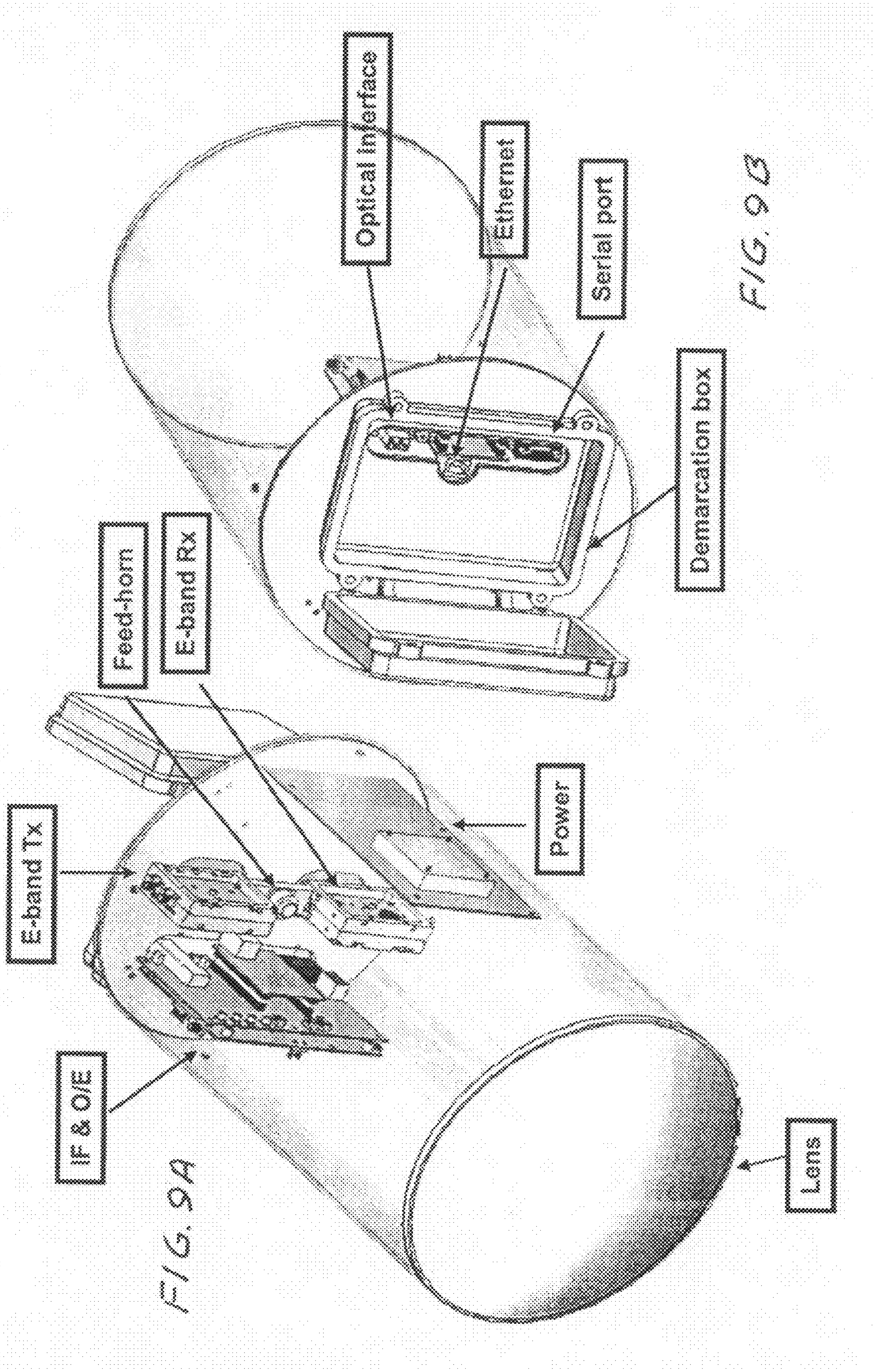
FIGS. 9A and 9B shows the layout of lens-based millimeter wave transceiver in cylindrical housing.
Figure 10:
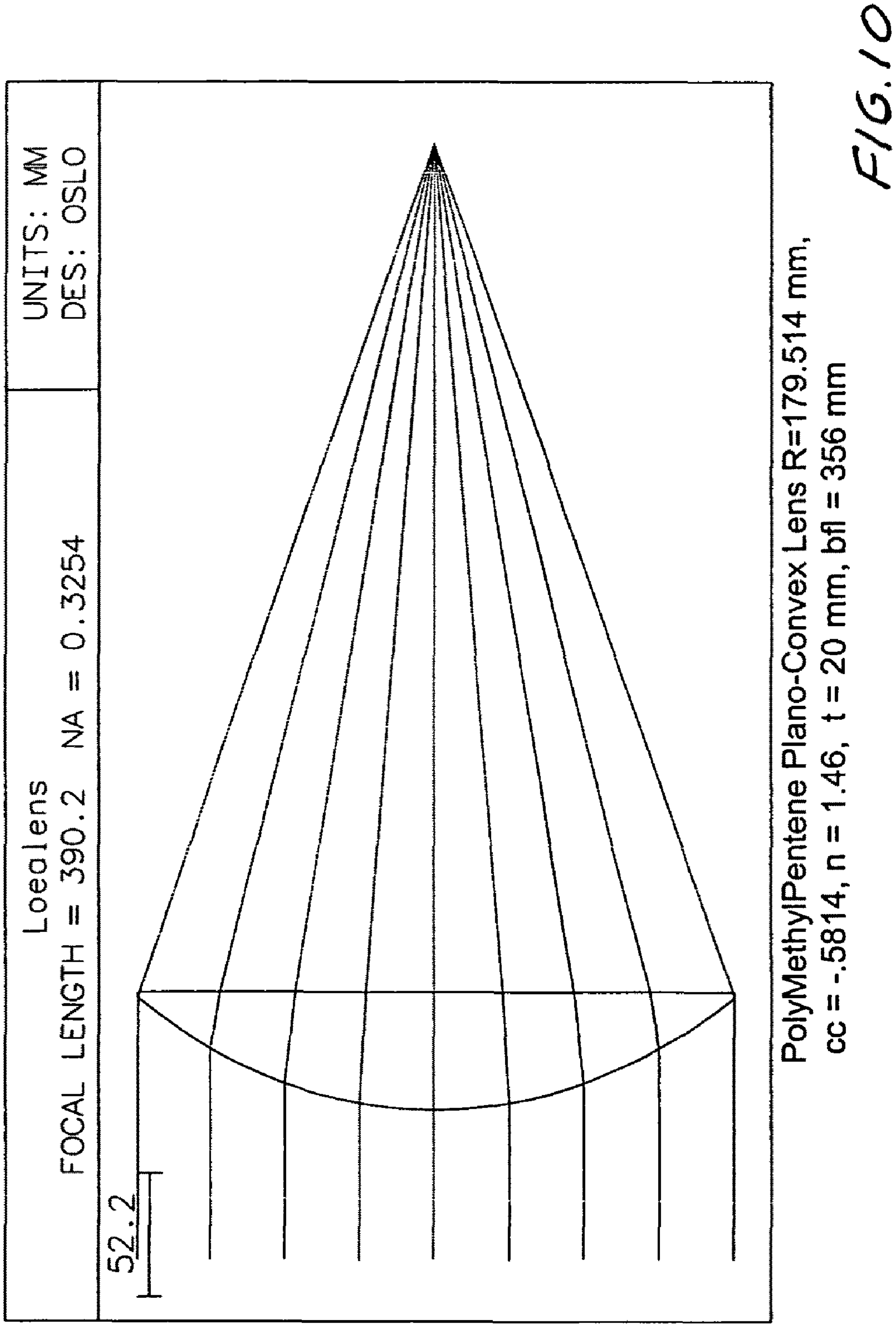
FIG. 10 is a drawing showing the optical parameters of a preferred lens design.

Drawings of two lens-based transceivers are shown at 12 and 14 in FIGS. 8A and 8B. Components include cylindrical housing 42, lens 31, feed horn 30, transmit electronics 24A, receive electronics 24B, diplexer unit 28, interface electronics module 32, Ethernet or fiber optics input-output 34, mount unit 40, azimuth adjustment 38 and elevation adjustment 36. Outgoing beam is shown at 13 and incoming beam is shown at 15 and the beam width is indicated at 23. Two prospective views of the transceiver showing these components are provided in FIGS. 9A and 9B. FIG. 10 describes the lens design. The lens is a polymethylpentene, plano-convex lens with R=179.514, cc=−0.5814, n=1.46, t=20 mm and bfl=356 mm.

Advantages of Lens System

A lens based transceiver can meet the side lobe requirements at a smaller size than a more commonplace parabolic reflector based transceiver because there is no central obscuration. The present invention provides a transceiver that meets the FCC requirements and also provides a beam divergent enough so that normal expected tower movement will not interfere with transmissions.

Importance of Good Feed Horn Design

Figure 13A:
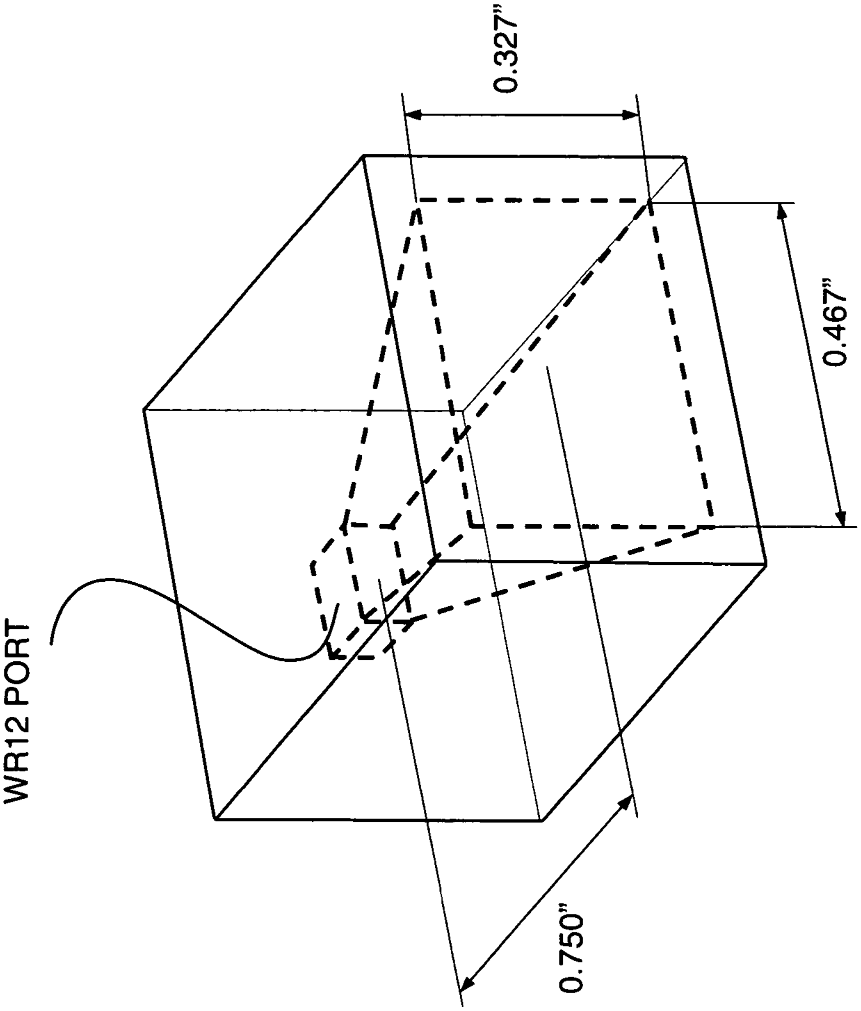
FIGS. 13A and 13B are drawings of a horn design.
Figure 13B:
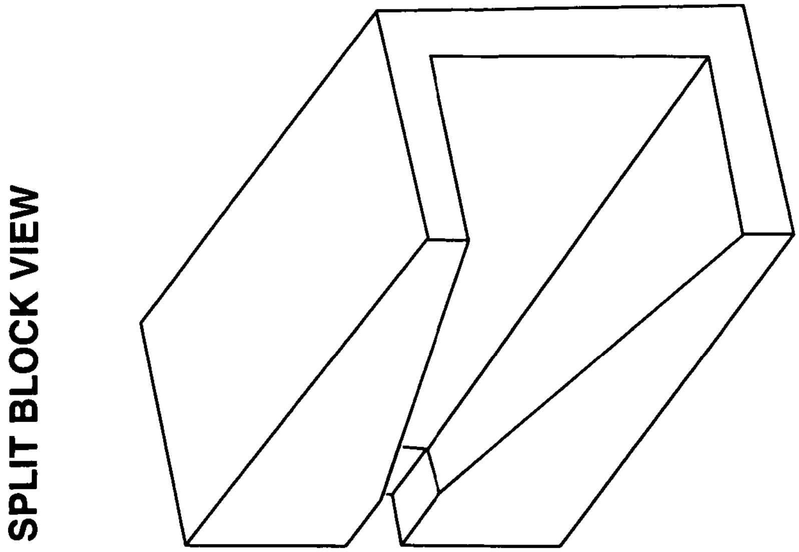
Figure 15:
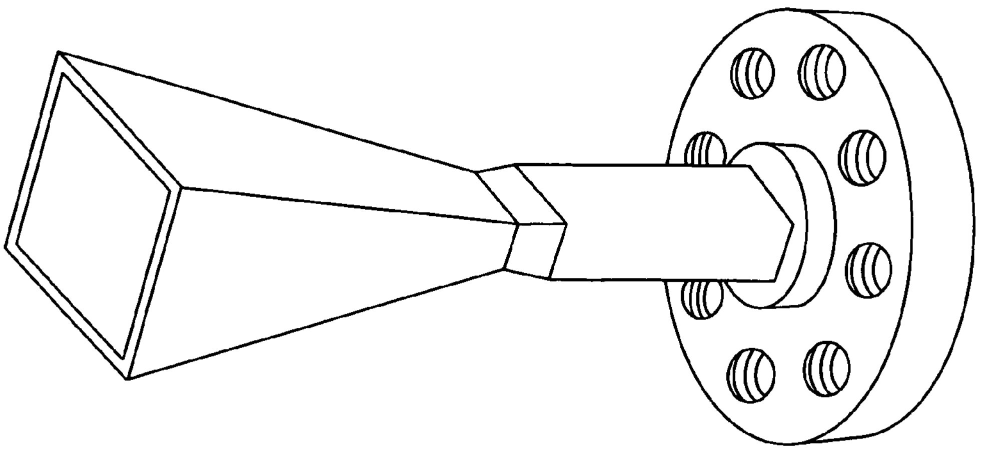
FIG. 15 is a copy of a photograph of a test horn and a portion of a scale indicating the size of the horn.
Figure 16:
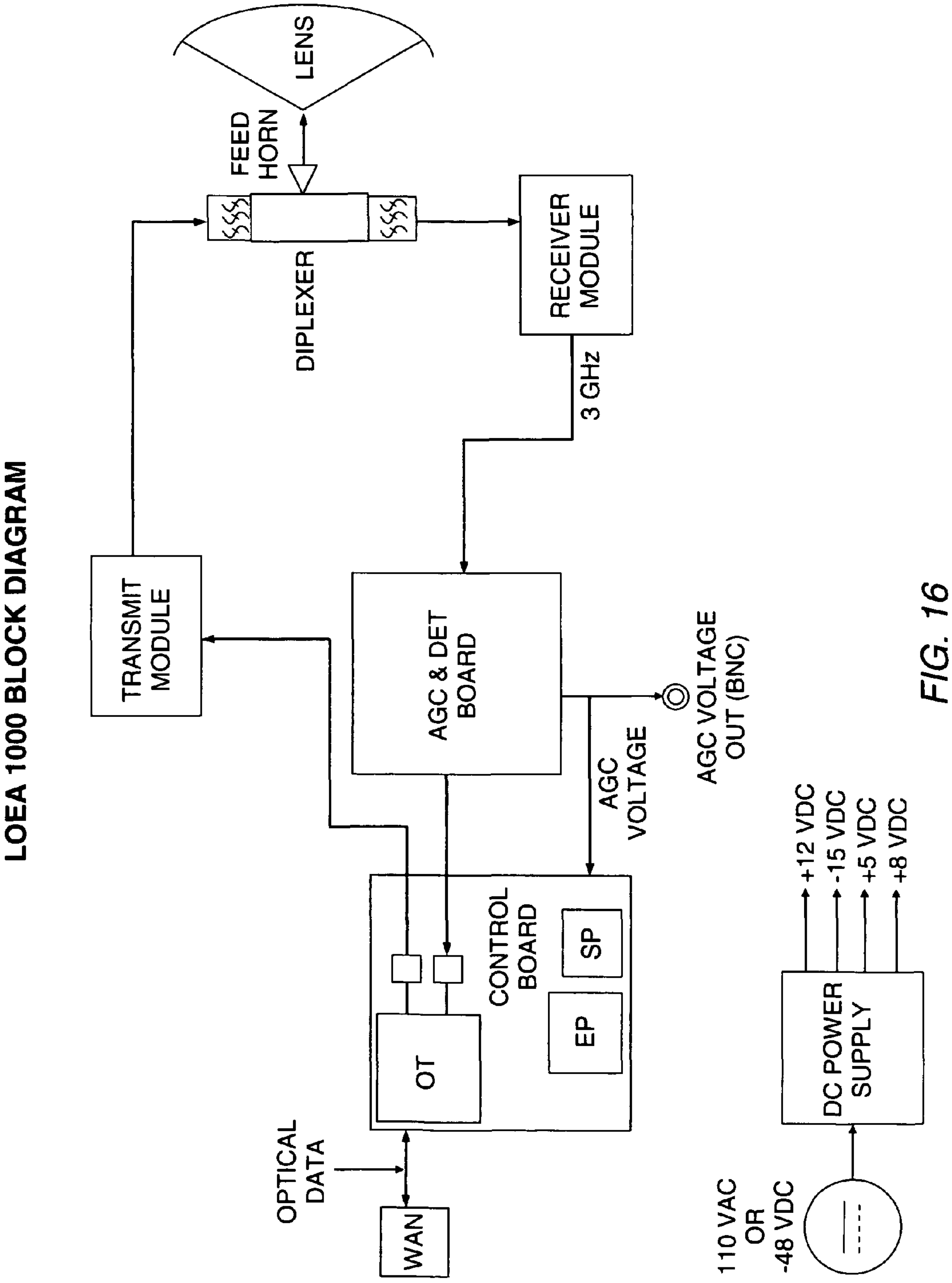
FIG. 16 is a block diagram of the principal components of a preferred embodiment of a transceiver in accordance with the present invention.

The design of the transceiver feed horn which illuminates the lens is critical because it determines the size of the intensity distribution on the lens. A preferred feed horn design fabricated out of solid copper is shown in FIGS. 13A and 13B. A prototype feed horn used for testing is shown in FIG. 15.

Figure 14A:
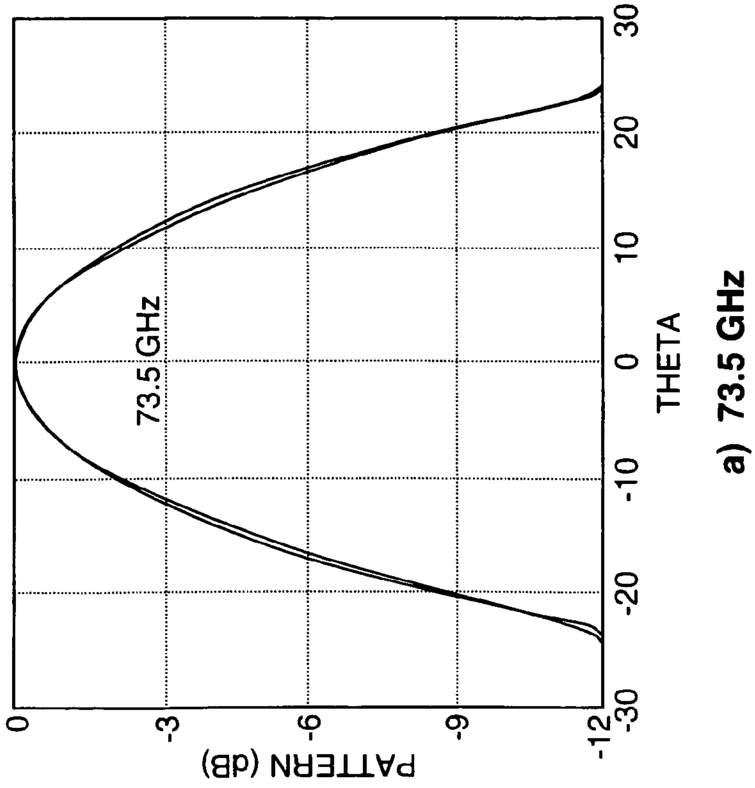
FIGS. 14A and 14B are plots of the beam output profile at 73.5 GHz and 83.5 GHz from the horn shown in FIGS. 9A and 9B.
Figure 14B:
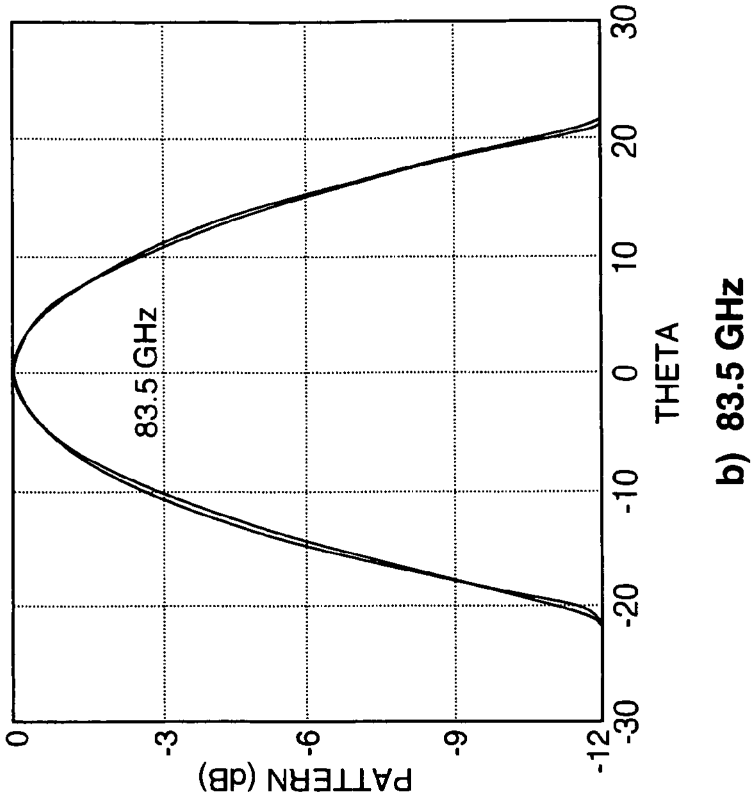

Applicants preferred feed horn patterns at 73.5 GHz and 83.5 GHz are shown in FIGS. 14A and 14B.

Figure 11A:
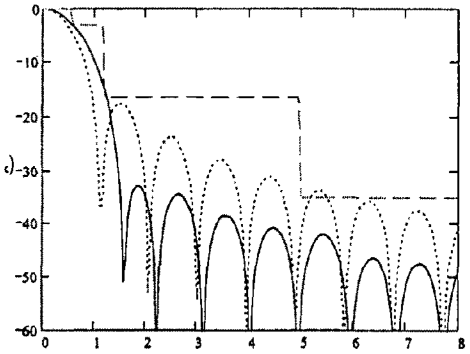
FIG. 11 is a set of drawings showing the comparison with FCC requirements of side lobe patterns for lenses having diameters ranging from 5 inches to 10 inches at a frequency of 73.5 GHz.
Figure 11B:
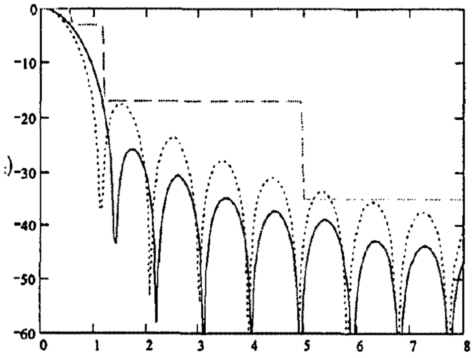
Figure 11C:
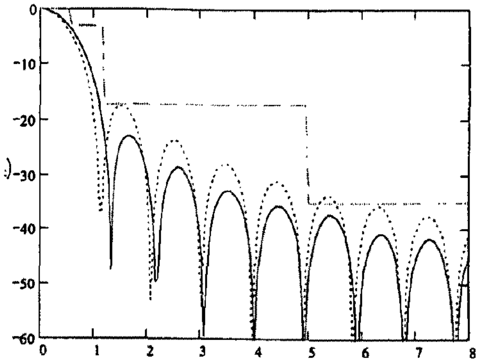
Figure 11D:
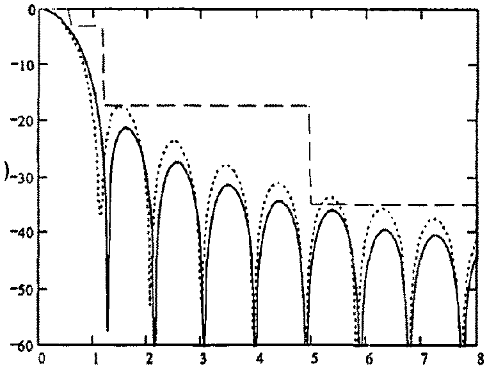
Figure 11E:
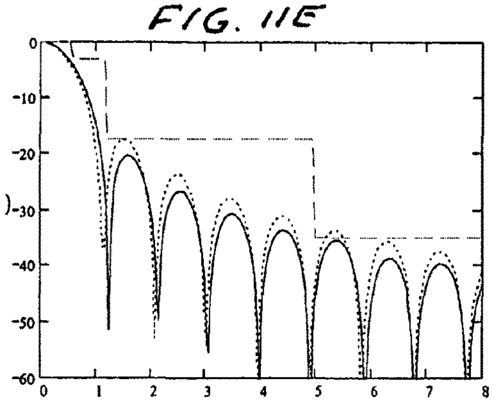
Figure 11F:
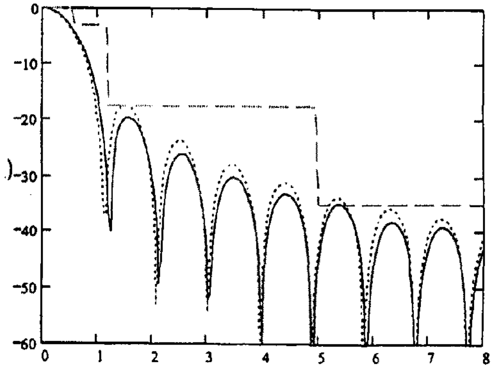
Figure 12A:
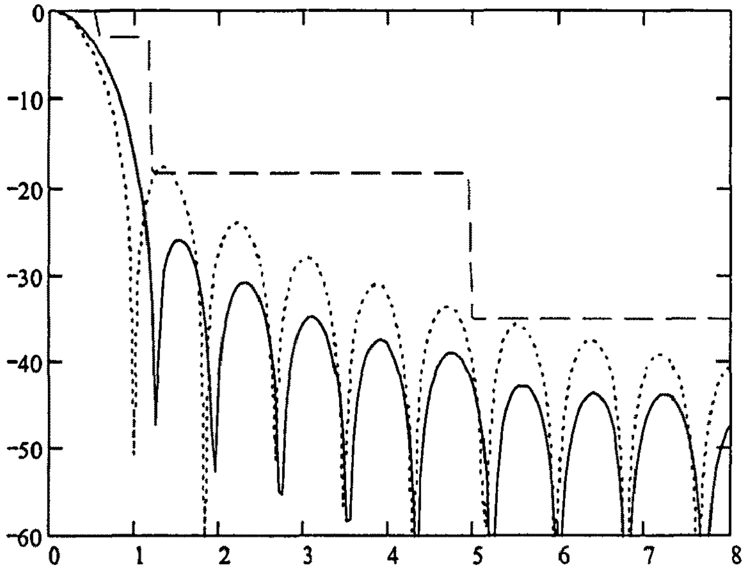
FIG. 12 is two drawings showing the comparison with FCC requirements of side lobe patterns for lenses having diameters of 6 inches to 9 inches at a frequency of 83.5 GHz.
Figure 12B:
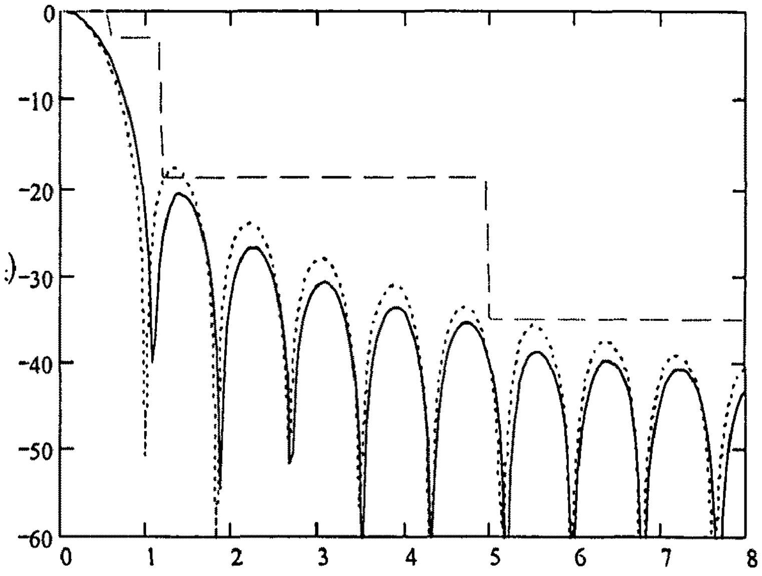

FIGS. 11A through 11F show antenna side lobes for six spot sizes from 5-inch to 10-inch diameters on a 9.85 inch diameter lens for a frequency of 73.5 Ghz. FIGS. 12A and 12B show the side lobes for 83.5 GHz with 6 and 9 inch spot sizes. The beam diameter values are 1/e power point values. The curves in these figures are predicted with a computer model. Dotted curves represent uniform illumination and the solid curves are predicted values for Gaussian illumination. Gaussian values are closer to actual test values. Applicants confirmed that experimental values are very close to calculated values. The FCC requirements are shown with dashed lines in the figures. If the spot size on the lens is too small, the divergence will be too large, and the main side lobe will not meet the required FCC mask at 1.2 degrees, as shown in FIG. 11A. If the spot size on the lens is too large, the divergence will be smaller, but there will be larger side lobes between 5 and 10 degrees, and interference with the FCC mask in that region. The side lobes are measured in both the horizontal and vertical direction. The polarization preferably will be in the horizontal or vertical direction. The minimum size lens, and thus the minimum size package, will be achieved if the pattern from the feed horn is approximately the same in both directions, one of which is called the E-plane and one of which is called the H-plane.

Millimeter Wave Absorber

Figure 17A:
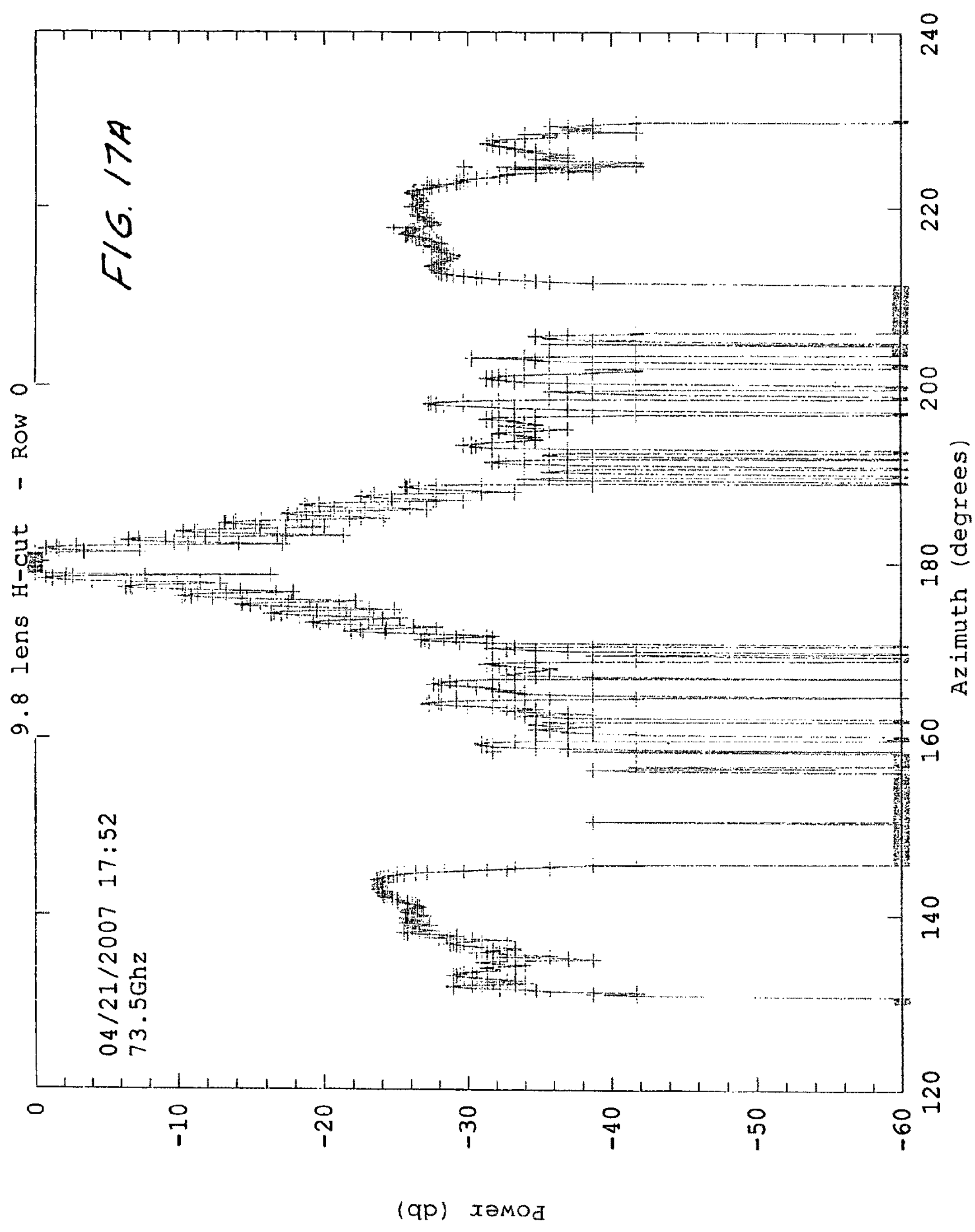
FIGS. 17A and 17B demonstrate the importance of a graded millimeter wave absorber within the transceiver housing for absorbing stray millimeter wave radiation.
Figure 17B:
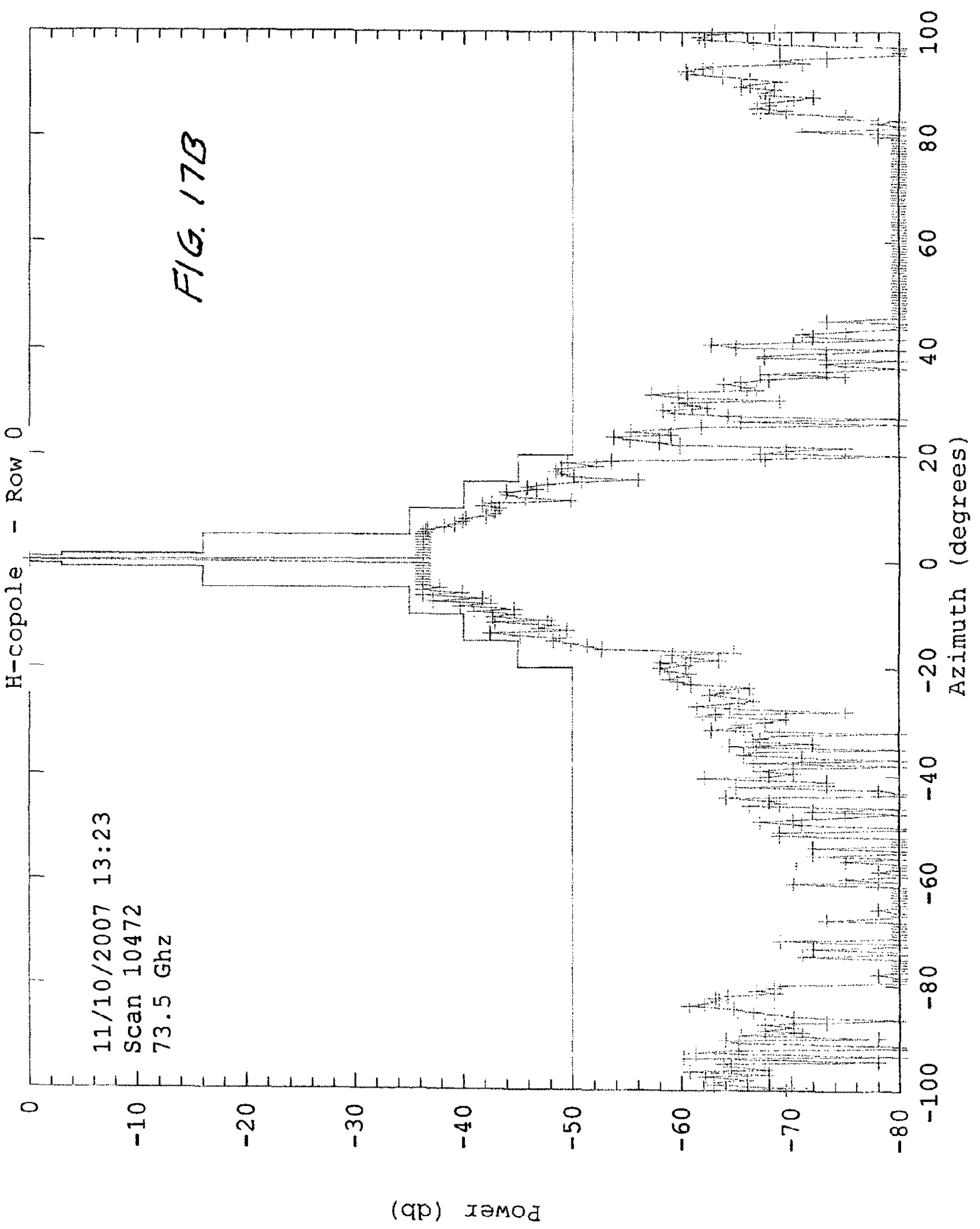

Applicant's initial test with the lens based transceiver showed greater energy in the side bands than was expected based on their calculations. They discovered that the extra energy in the side bands was due to stray reflections off the internal structure of the metal housing. Applicants solved this serious problem by covering the internal portions of the housing surrounding the lens that are exposed to the stray millimeter wave radiation with a density graded carbon based foam material to absorb most to the stray radiation. The foam material has a very low density at the surface illuminated by the stray radiation and much heavy density where it is glued to the metal internal surfaces. The foam material is positioned to surround the lens. FIG. 17A shows the distribution of the beam power as a function of azimuth degrees without the foam absorber and FIG. 17B shows the same profile with the foam absorber.

Transmit Chain

For units transmitting at 73.5 GHz, the 73.5 GHz frequency is created utilizing an integrated phase locked voltage controlled oscillator (PLVCO) and a multiplier. This signal is directly modulated (utilizing On-Off Keying techniques) at a rate based on the data signal received from the optical transceiver module located on the control board. The modulated signal is amplified, delivered out of the waveguide port and fed into the diplexer which filters the output to between 71 and 76 GHz. The filtered signal is then delivered to the feed horn which illuminates the 9.85 focusing lens. The maximum achievable transmit power at the antenna port is =23 dBm under ideal operating conditions. Typically the Tx power is a few dB's less than this due to circuit losses and lower active component operating efficiencies. For units transmitting at 83.5 GHZ operations are identical except for the frequency range.

Receive Chain

For units receiving at 83.5 GHz, the received 83.5 GHz input signal is passed to the diplexer where it is focused into a feed horn, filtered by the diplexer to be between 81 and 86 GHz. From the diplexer the 83.5 GHz signal is then fed into the receiver module Inside the receiver module, the frequency is down-converted to a 3 GHz IF frequency using an integrated PLVCO. The 3 GHz signal is then fed to a AGC/Detector Board for demodulation. For units receiving at 73.5 GHz, the identical operations are performed except that now the received signal is 73.5 GHz.

Control Board

The control board receives two external mandatory optical signal interfaces and one optional network connection. The external optical data is presented to the control board via a WAN signal connector. An LC fiber optic connector is the standard interface. For applications using a Gigabit Ethernet standard, a single mode 1310 nm fiber interface is used. An optical transceiver on the control board converts the optical data to electrical signals which in turn is sent to the millimeter wave transmit module. Since the radio can be viewed as a network element, a standard FJ-45 connector for a SSL (Secure) and SNMP connection is also provided on the control board as an optional NOC interface for link monitoring. (The radio's on board computer allows users to access to link status only, the hooks are out of band and radio performance can not be remotely altered.) A RS connector on the control board provides access to the on-board computer to facilitate code updates and other operations. The control board accepts an AGC voltage from the AGC/Det board to mute the optical transceiver. An external transmit data signal (PRBS) can be applied to the control board for testing purposes.

AGC/Det Board

This board receives a 3 GHz IF signal, detects it and generates a data stream that is fed to the optical transceiver on the control board. In addition this board provides an AGC output voltage that is used for measuring received signal strength and antenna alignment. The AGC voltage is also passed to the control board for controlling the transmit data stream.

AC/DC Converter, DC/DC Converter and Power Distribution Board

For DC power operation, a −48 DC connection is made via 18 AWG wiring. The DC voltage is fed into a DC to DC converter on the power supply board which in turn provides +5 V DC, +12 V DC and −12 V DC. The power supply board receives and conditions the input voltages for the DC to DC converter board as well as also generating a −5V DC voltage. The outputs from the power supply board are then fed to the rest of the radio. For operational AC power, a 110 V AC connection is made via a separate demark box that contains an AC power supply that outputs −48 V DC. The −48 V DC is connected to a DC to DC converter on the power supply board which in turn provides +5 V DC, +12 V DC and −12 V DC. The power supply board receives and conditions the input voltages from the DC to DC converter board as well as generating a −5 V DC voltage. The outputs from the power supply board are then fed to the rest of the radio.

Applications of the Lens-Based Transceiver Linking Cellular Base Stations

An important application of the present invention is to provide wireless communication among wireless users through a number of cellular base stations. Some of the base stations may be mobile base stations in which low and high speed wireless transceivers are mounted on a temporarily stationary mobile vehicle such as a truck trailer or a truck. System include at least one connecting station with a millimeter wave wireless transceiver in communication with a fiber optic or high-speed cable communication network. Each of the base stations serves a separate communication cell. Each base station is equipped with a low frequency wireless transceiver for communicating with the wireless users within the cell at a radio frequency lower than 6 GHz and a millimeter wave wireless transceiver operating at a millimeter wave frequency higher than 60 GHz for communicating with another millimeter wave transceiver at another base station or a millimeter wave transceiver at said at the connecting station. The base stations are also equipped with data transfer means for transferring data communicated through the low frequency wireless transceiver to the millimeter wave wireless transceiver and for transferring data communicated through the millimeter wave wireless transceiver to the low frequency wireless transceiver. In preferred embodiments the system is a part of a telephone system, an Internet system or a computer network.

The antennas at the base station provide beam divergence small enough to ensure efficient spatial and directional partitioning of the data channels so that an almost unlimited number of point-to-point transceivers will be able to simultaneously use the same millimeter wave spectrum. In preferred embodiments the millimeter wave trunk line interfaces with an Internet network at an Internet point of presence. In these preferred embodiments a large number of base stations are each allocated a few MHz portion of the 5 GHz bandwidths of the millimeter wave trunk line in each direction. A first transceiver transmits at 71-76 GHz and receives at 81-86 GHz, both within the above spectral range. A second transceiver transmits at 81-86 GHz and receives at 71-76 GHz.

The millimeter wave trunk line bandwidth is efficiently utilized over and over again by using transmitting antennae that are designed to produce very narrow beams directed at receiving antennae. The low frequency wireless internet access bandwidth is efficiently utilized over and over again by dividing a territory into small cells and using low power antennae. In preferred embodiments wireless internet access base stations are prepackaged for easy, quick installation at convenient locations such as the tops of commercial buildings. In other embodiments the base stations may be mounted on trucks that can be moved quickly to a location to provide emergency or temporary high data rate communication.

Millimeter Wave Trunk Lines

A first preferred embodiment of the present invention comprises a system of linked millimeter-wave radios which take the place of wire or fiber optic links between the cells of a cellular network. A second preferred embodiment of the present invention comprises a system of linked millimeter wave radios which take the place of wire or fiber optic links between wireless Internet access base stations or wireless computer networking base stations. The use of the millimeter-wave links can eliminate the need to lay cable or fiber, can be installed relatively quickly, and can provide high bandwidth normally at a lower cost than standard telecom-provided wires or cable. Since the millimeter-wave links simply up and down convert the signal for point-to-point transmission, the data and protocols used by the original signals are preserved, making the link 'transparent' to the user. These trunk lines can support a conventional system operating at standard cellular telephone frequencies, but it is equally applicable to other, newer technologies such as 1.8 GHz to 1.9 GHz PCS systems, wireless internet frequencies, computer networking frequencies and systems operating at frequencies such as 2.4 GHz, 3.5 GHz and 5.8 GHz.

Cellular Phone Base Station

Figure 3A:
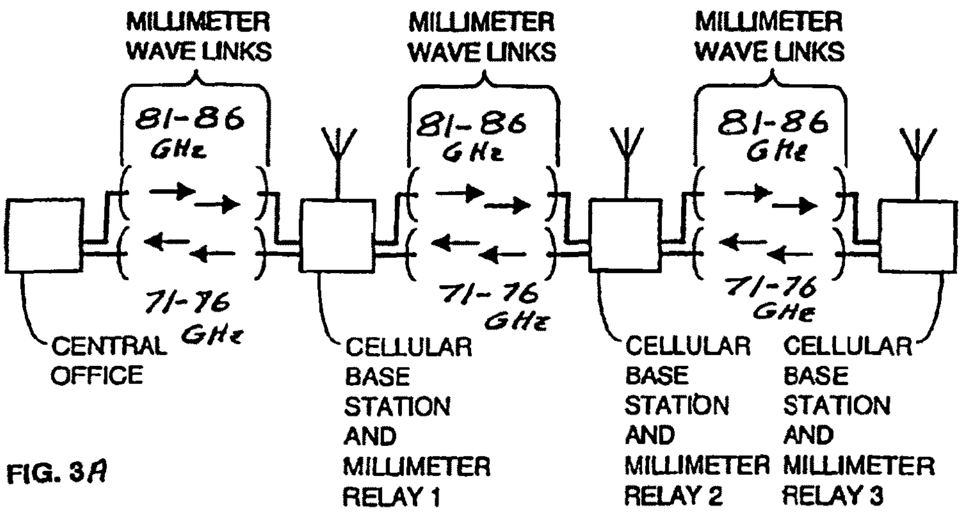
FIG. 3A is a sketch of a millimeter wave trunk line connecting cellular base stations.

A typical prior art cell phone base station transmits in the 824-851 MHz band and receives in the 869-901 MHz band and is connected to a mobile telephone switching office by wire connections which is in turn connected to a central office via a high speed wired connection. The central office performs call switching and routing. It is possible to replace both wired links with a millimeter-wave link, capable of carrying the signals from several cellular base stations to the central office for switching and routing, and then back out again to the cellular base stations for transmission to the users' cellular phones and other communication devices. A millimeter-wave link with 1 GHz of bandwidth will be capable of handling approximately 30 to 90 cellular base stations, depending on the bandwidth of the base stations. Since the cellular base stations are typically within a few miles (or less for micro cells) of each other, the millimeter-wave link would form a chain from base station to base station, then back to the central office. FIG. 3A illustrates the basic concept for a telephone system.

Cellular Base Station Transmission Back to Central Office

Cell phone calls are received in the 824-851 MHz band at each group of base stations, and up-converted to a 27 MHz slot of frequencies in the 71-76 GHz band for transmission over the link back to the central office. Each group of base stations is allocated a 27 MHz slice of spectrum in the 71-76 GHz band as follows:

| 1 Base Station Group Number | Base Station Frequency | Trunk Line Frequency |
|---|---|---|
| 1 | 824-851 MHz | 72.293-72.320 GHz |
| 2 | 824-851 MHz | 72.370-72.397 GHz |
| 3 | 824-851 MHz | 72.447-72.474 GHz |
| . | . | . |
| . | . | . |
| . | . | . |
| 30 | 824-851 MHz | 74.526-74.553 GHz |
| 31 | 824-851 MHz | 74.603-74.630 GHz |
| 32 | 824-851 MHz | 74.680-74.707 GHz |

Figure 4A:
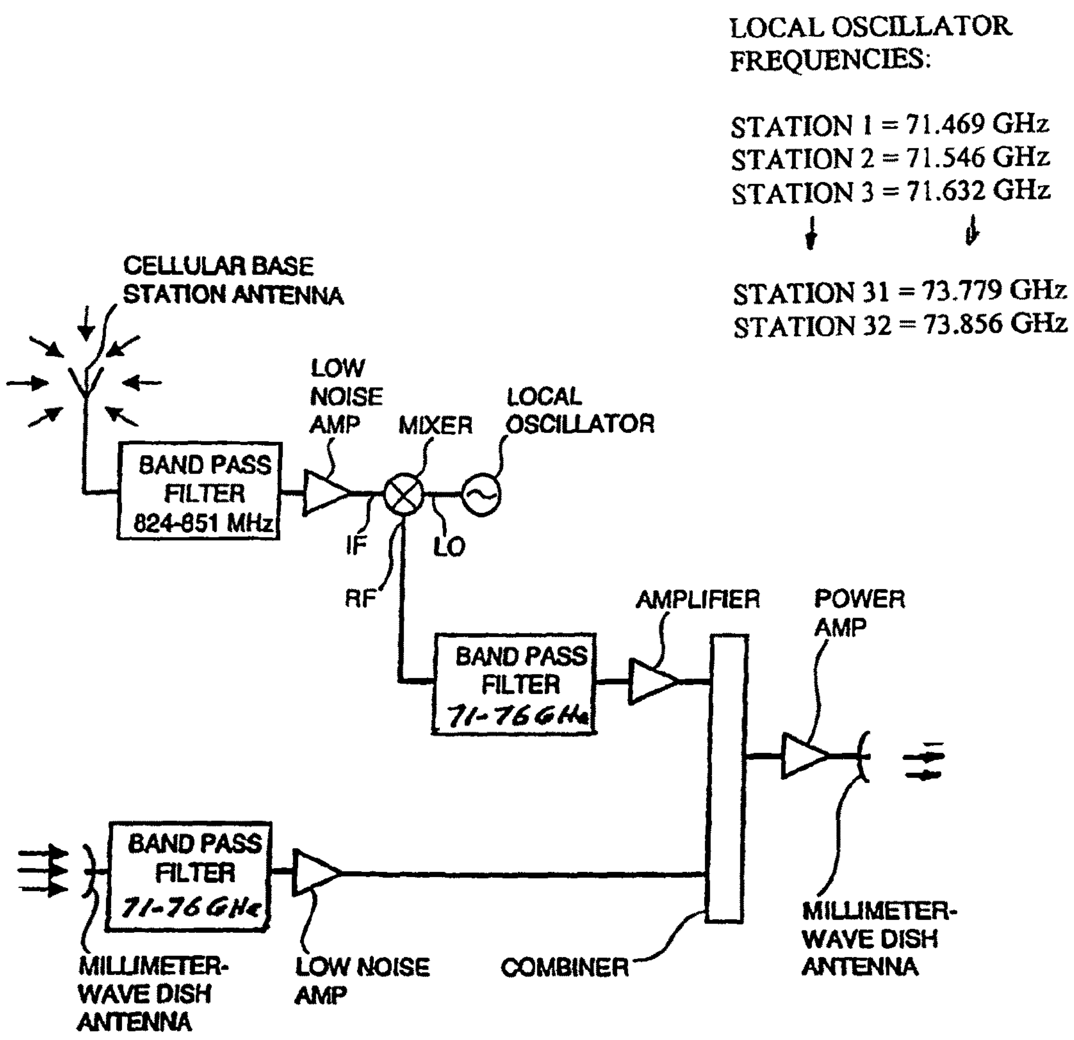
FIG. 4A demonstrates up conversion from cell phone frequencies to trunk line frequencies.

FIG. 4A shows a block diagram of a system that converts the cellular base station frequencies up to the millimeter-wave band for transmission back to the central office. Each base station receives both the cell phone frequencies within its cell, and the millimeter-wave frequencies from the earlier base station in the chain. The cell-phone frequencies are up-converted to a slot (of spectrum) in the 71-76 GHz band and added to the 71-76 GHz signals from the earlier base station up the chain. The combined signals are then retransmitted to the next base station in the chain. Each base station has a local oscillator set to a slightly different frequency, which determines the up-converted frequency slot for that base station. The local oscillator may be multiplied by a known pseudo-random bit stream to spread its spectrum and to provide additional security to the millimeter-wave link.

At the telephone company central switching office, each 27 MHz slot of frequencies in the 71-76 GHz band is down-converted to the cellular telephone band. If a spread-spectrum local oscillator was used on the millimeter-wave link, the appropriate pseudo random code must be used again in the down-converter's local oscillator to recover the original information. Once the millimeter-wave signals are down-converted to the cell phone band, standard cellular equipment is used to detect, switch, and route the calls.

Central Office Transmission to Cellular Base Stations

Cell phone calls leave the central office on a millimeter-wave link and each group of cellular base stations down converts a 32 MHz slice of the spectrum to the cell phone band for transmission to the individual phones. The cellular base stations transmit (to the phones) in the 869-901 MHz band so each group of base stations requires a 32 MHz slice of the spectrum in the 81-86 GHz range on the millimeter wave link. The 5 GHz bandwidth will easily support 32 base stations. Each group of base stations is allocated a 32 MHz slice of spectrum in the 81-86 GHz band as follows:

Base station # Trunk Line Frequencies (link RX) Converts to Base Station (cell TX)

| Base Station Group Number | Trunk Line Frequency | Base Station Frequency |
|---|---|---|
| 1 | 82.213-82.245 GHz | 869-901 MHz |
| 2 | 82.295-82.327 GHz | 869-901 MHz |
| 3 | 82.377-82.409 GHz | 869-901 MHz |
| . | . | . |
| . | . | . |
| . | . | . |
| 30 | 84.591-84.623 GHz | 869-901 MHz |
| 31 | 84.673-84.705 GHz | 869-901 MHz |
| 32 | 84.755-84.787 GHz | 869-901 MHz |

Figure 5A:
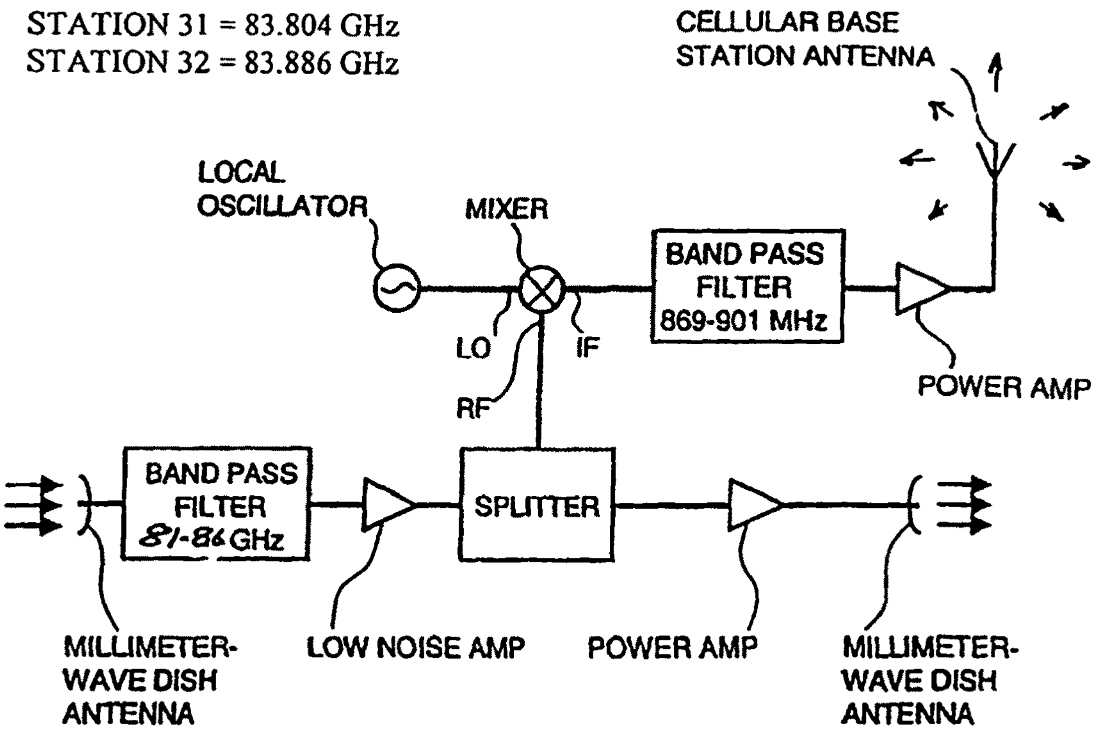
FIG. 5A demonstrates down conversion from trunk line frequencies to cell phone frequencies.

FIG. 5A shows a block diagram of a system that receives millimeter-wave signals from the central office and converts them to the cellular band for transmission by a cell base station. Each base station receiver picks off the signals in its 32 MHz slice of the 81-86 GHz spectrum, down-converts this band to the cell phone band, and broadcasts it. The 81-86 GHz band is also retransmitted to the next base station in the chain. Each base station has a local oscillator set to a slightly different frequency, which determines the 32 MHz wide slot (in the 81-86 GHz band) that is assigned to that base station. If a spread-spectrum local oscillator was used on the up-conversion at the central office, then the appropriate pseudo random code must be used again in the down-converter's local oscillator (at each base station) to recover the original information.

At the telephone company central switching office calls are detected, switched, and routed between the various cellular base stations and the landline network. Each group of cellular base stations is represented at the central office by a 32 MHz wide slot of spectrum, which is up-converted to the 81-86 GHz band and sent out over a point-to-point link to the chain of several base stations. The local oscillator used to up-convert the signals may be spread-spectrum to provide additional security to the millimeter-wave link.

Wireless Computer Networks and Wireless Internet

Figure 1:
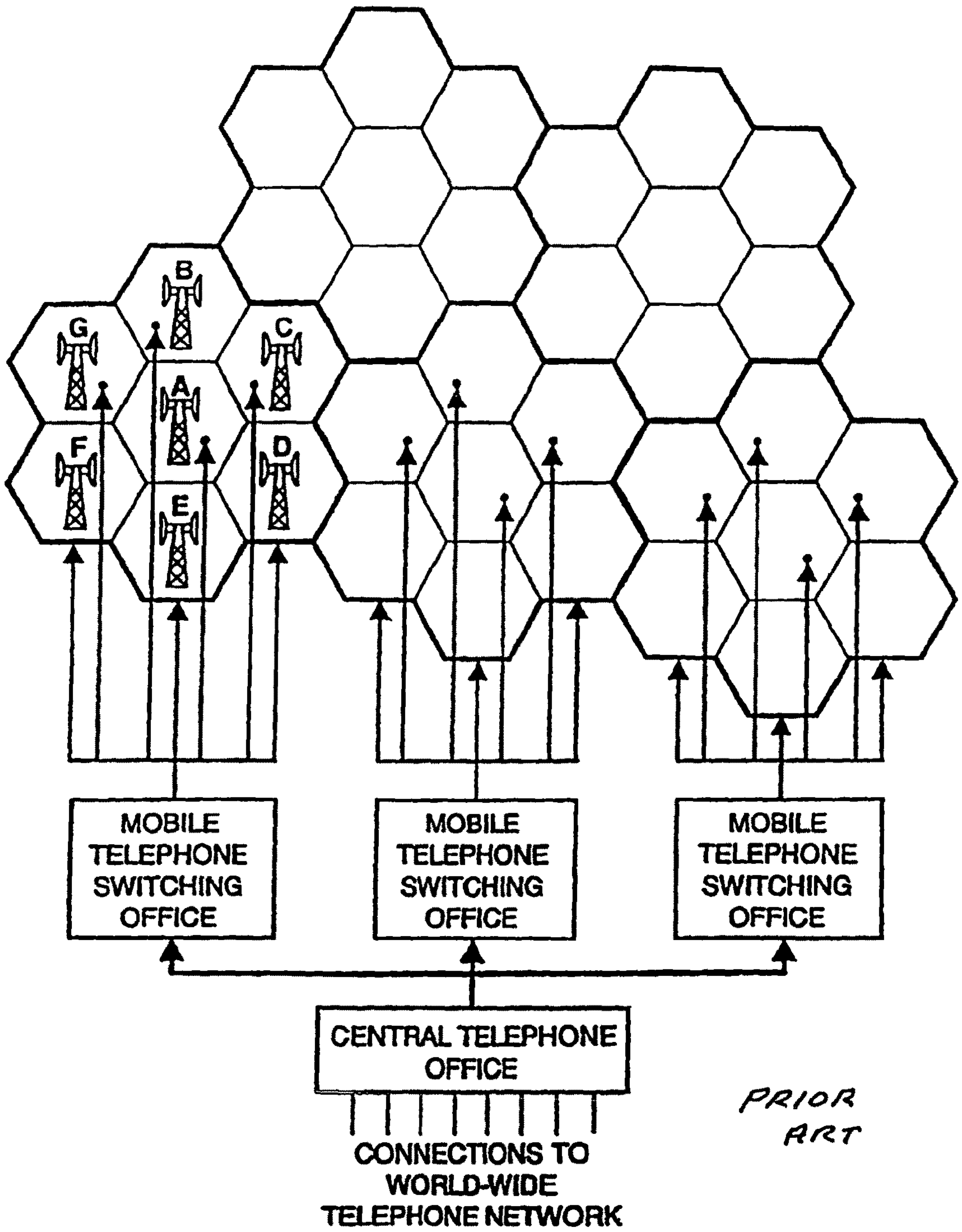
FIG. 1 is a sketch showing a prior art cellular network.
Figure 2:
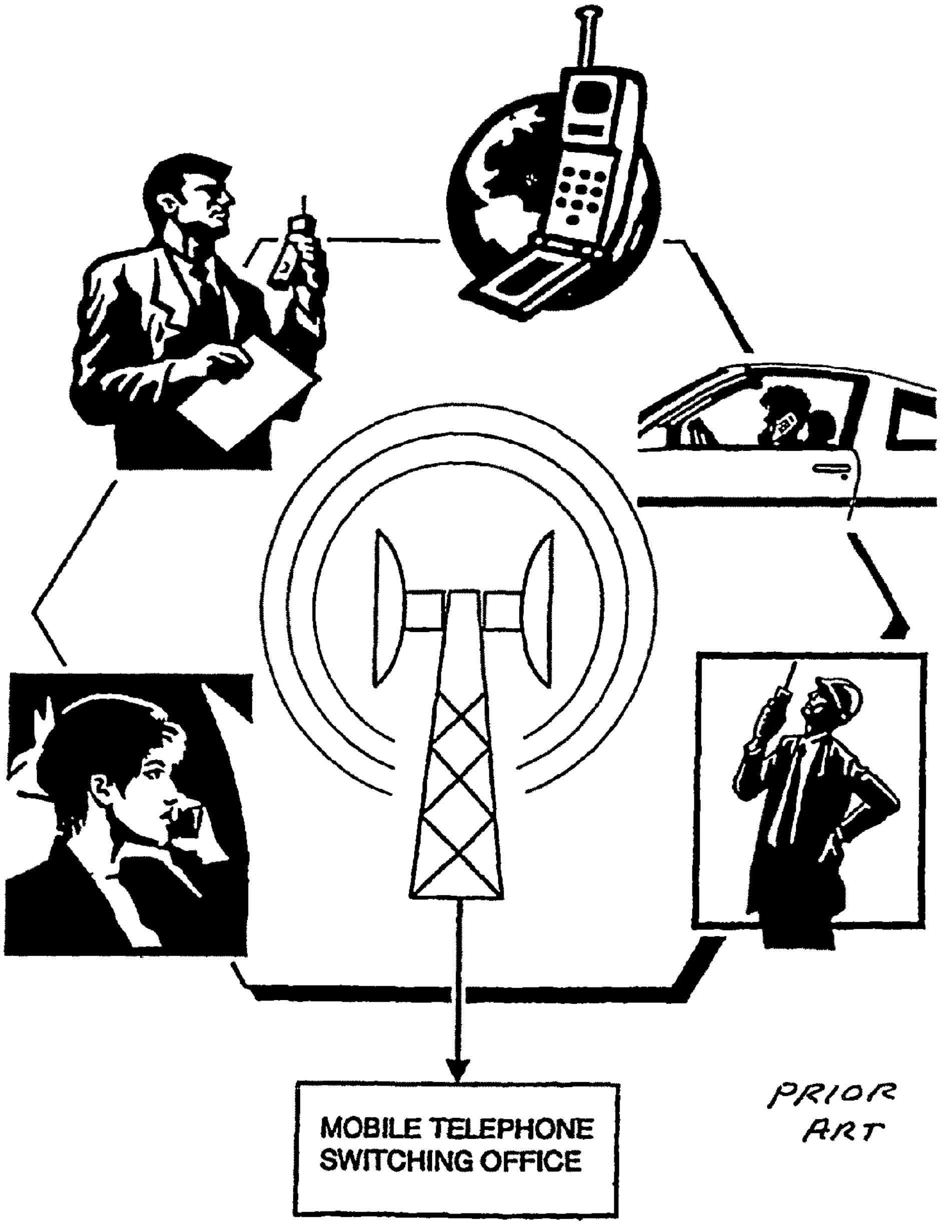
FIG. 2 is a sketch showing features of a single prior art cell.

Most wireless computer networking equipment on the market today is designed according to IEEE standards 802.11a and 802.11b that describe a format and technique for packet data interchange between computers. In this equipment the 802.11b formatted data is transmitted and received on one of eleven channels in the 2.4-2.5 GHz band and uses the same frequencies for transmit and receive. Therefore, in preferred embodiments the cellular stations all operate on a slice of the 2.4 to 2.5 GHz band using equipment built in accordance with the above IEEE standards. An up/down converter is provided to up and down convert the information for transmittal on the millimeter wave links. The up/down converter is described below. Typically, base stations are organized in generally hexagonal cells in groups of 7 cells (similar to cellular phone networks) as shown in FIG. 1. In order to avoid interference, each of the 7 cells operate at a different slice of the available bandwidth in which case each frequency slice is separated by two cells. If 3 different frequencies are used in the group of 7 cells, there is a one-cell separation of frequencies.

A typical prior art wireless internet access base station, or access point, providing wireless computer networking, transmits and receives in one of a few designated bands. These bands include the 2.4 GHz unlicensed band, with typical operation between 2.4 and 2.4835 GHz (radios using IEEE standards 802.11b or 802.11g operate in this band), the 3.5 GHz licensed band, with typical operation between 3.4 and 3.6 GHz (radios using IEEE standards 802.16c and 802.16d operate in this band), and the license exempt 5.8 GHz band, with typical operation between 5.725 and 5.85 GHz (this band is part of the FCC designated U-NII band intended for community networking communications devices operating over a range of several kilometers). The 802.16 standards for wireless computer networking are sometimes referred to as WiMax. The 802.11 standards are sometimes referred to as WiFi. These standards can be used in many different frequency bands as specified in the IEEE standards. In the specifications which follow, specific implementation examples have been given in the 5.725 GHz to 5.85 GHz band, but this is not to be taken as any limitation.

Figure 3B:
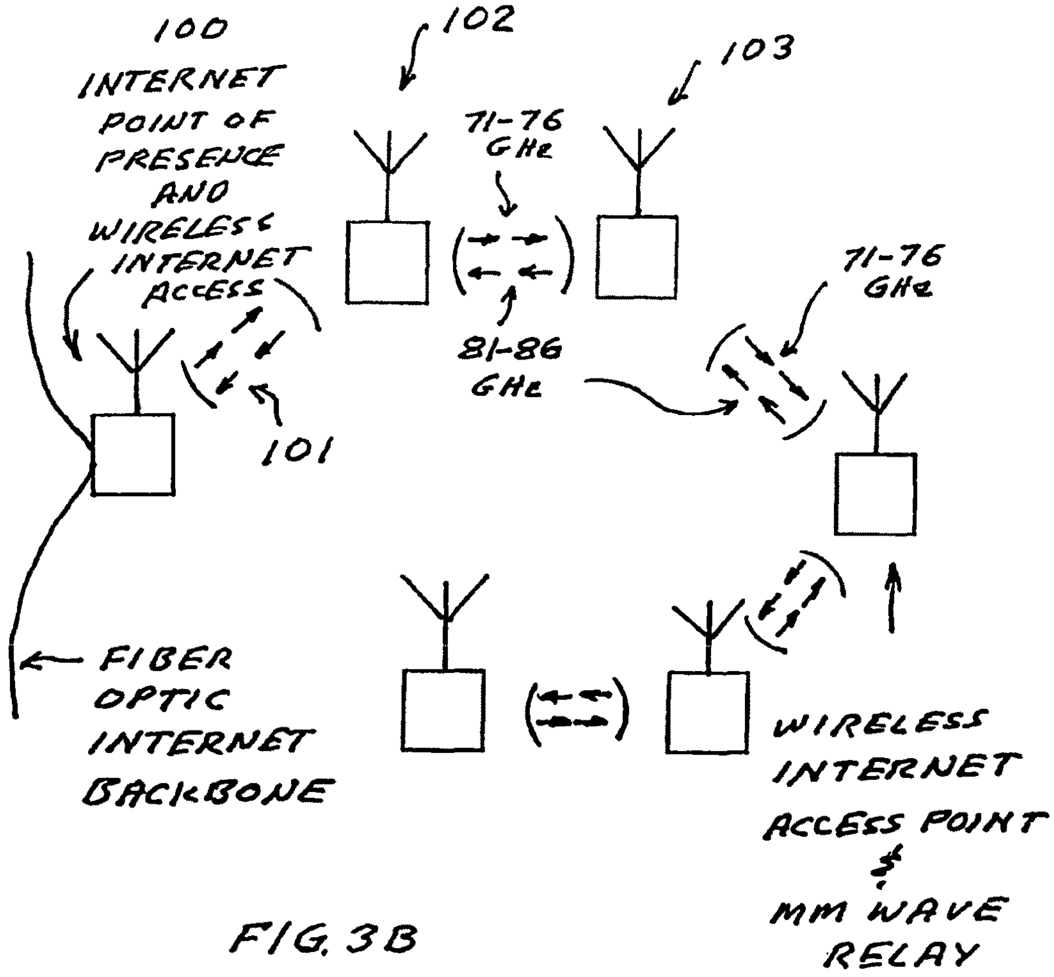
FIG. 3B is a sketch of a millimeter wave trunk line connecting wireless internet access base stations.

FIG. 3B shows how wireless internet access points (or WiMax or WiFi or wireless computer networking access points) might be connected to the fiber optic internet backbone according to the present invention. At some location 100 on the Internet backbone there is what is referred to as a "point of presence", which is a location where there is access to the fiber backbone. Alternately, there could be a switch or router at this location without any wireless access point. In the figure, a high speed millimeter wave communications link 101 provides a connection between this point of presence and a second wireless internet access point 102 at a location remote from the fiber point of presence, but visible through an unobstructed line of sight. The wireless internet access point provides wireless internet or other computing connections to users within some geographic region surrounding the access point, using equipment according to one of the wireless standards (such as IEEE 801.16) and radios operating in one of the designated frequency bands (such as 5.725 to 5.85 GHz). These radios are manufactured and operate according to principles and designs known in the relevant art. Continuing on, this second wireless internet access point communicates with a third wireless internet access point (or base station) 104 through another high bandwidth millimeter wave line of sight communications link 103. In the figure, this communications link is shown to use the 71-76 GHz frequency band in one direction (away from the fiber point of presence) and the 81-86 GHz frequency band in the other direction (towards the fiber point of presence). Because the communications carrying capacity of the high frequency millimeter wave links is much greater than the communications bandwidth needed at each wireless internet access base station, many such base stations can be connected in this manner as indicated generally at 105.

Wireless Internet Base Station Transmission Back to Fiber Point of Presence

Wireless computer networking communications traffic is received in the 5725-5850 MHz band at each base station, and up-converted to a 125 MHz slot of frequencies in the 81-86 GHz band for transmission over the millimeter wave link back to the fiber point of presence. Each base station is allocated a 125 MHz slice of spectrum in the 81-86 GHz band as follows, with appropriate guard bands (in this case with 50 MHz width):

| Base Station Number | Base Station Frequency | Trunk Line Frequency |
|---|---|---|
| 1 | 5725-5850 MHz | 81.775-81.900 GHz |
| 2 | 5725-5850 MHz | 81.950-82.075 GHz |
| 3 | 5725-5850 MHz | 82.125-82.250 GHz |
| . | . | . |
| . | . | . |
| . | . | . |
| 18 | 5725-5850 MHz | 84.750-84.875 GHz |
| 19 | 5725-5850 MHz | 84.925-85.050 GHz |
| 20 | 5725-5850 MHz | 85.100-85.225 GHz |

Figure 4B:
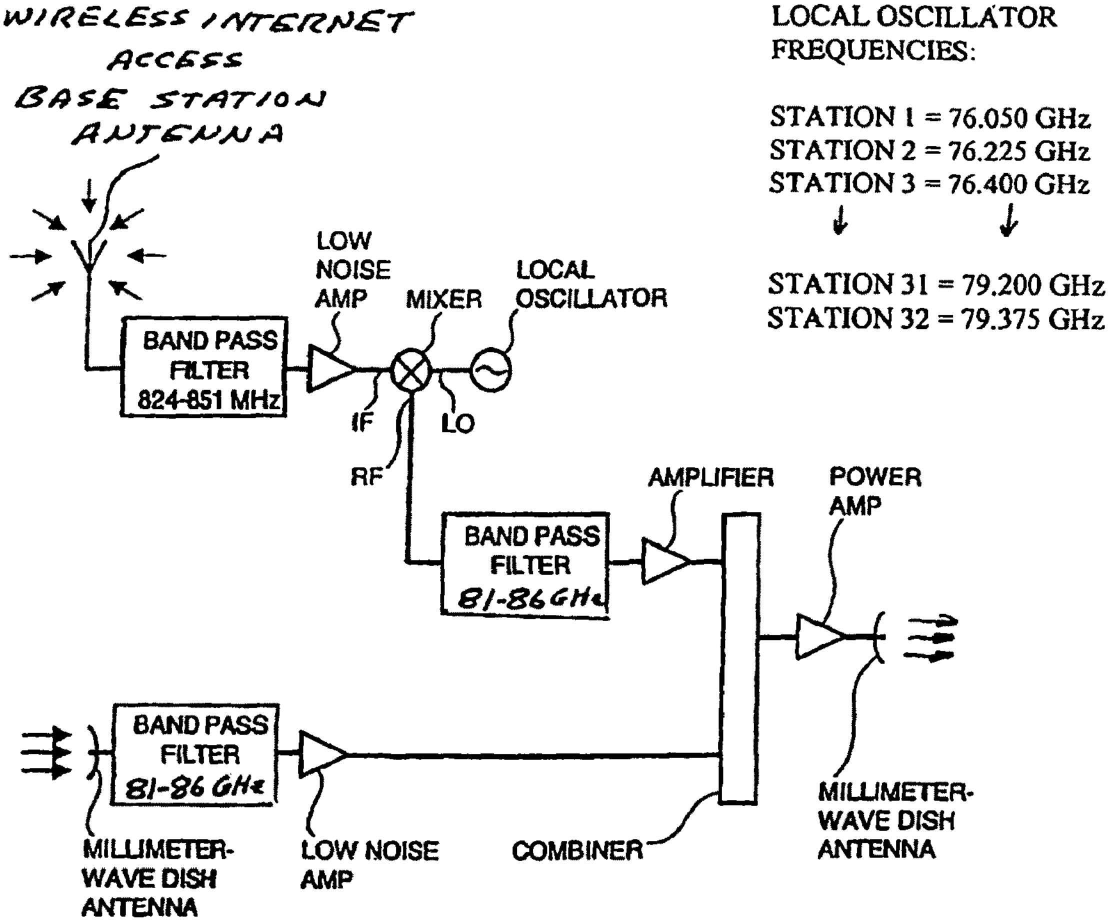
FIG. 4B demonstrates up conversion from wireless internet access frequencies to trunk line frequencies.

FIG. 4B shows a block diagram of a system that converts the wireless internet base station frequencies up to the millimeter-wave band for transmission back to the central office. Each base station receives both the wireless computer networking frequencies within its geographical coverage area, and the millimeter-wave frequencies from the earlier base station in the chain. The wireless computer networking frequencies are up-converted to a slot (of spectrum) in the 81-86 GHz band and added to the 81-86 GHz signals from the earlier base station up the chain. The combined signals are then retransmitted to the next base station in the chain. Each base station has a local oscillator set to a slightly different frequency, which determines the up-converted frequency slot for the base station.

At the fiber point of presence, each 125 MHz slot of frequencies in the 81-86 GHz band is down-converted to the wireless internet access band, where standard equipment is used to recover the original wireless user traffic. This user traffic is then combined digitally for switching or routing onto the internet backbone, and then on to the desired recipient location.

Fiber Point of Presence Transmission to Wireless Internet Base Stations

Internet or wireless computing traffic with user destinations served by the wireless base stations is separated from the rest of the internet traffic on the backbone at the internet or fiber Point of Presence. The traffic destined for each base station is formatted for the appropriate low frequency wireless channel (for example, 5725-5850 GHz) and then up-converted to a 125 MHz slot in the 71-76 GHz spectrum, with each base station being allocated a different slot. At each base station the appropriate slice of spectrum is then down-converted for transmission to individual users in the 5725 to 5850 GHz band. Since each base station requires less than 125 MHz of bandwidth, the 71-76 GHz millimeter wave spectral band (5,000 MHz) will easily support 20 different base stations, even allowing for 50 MHz guard bands. Each base station is allocated a 125 MHz slice of spectrum in the 71-76 GHz band as follows:

| Base Station Number | Base Station Frequency | Trunk Line Frequency |
|---|---|---|
| 1 | 5725-5850 MHz | 71.775-71.900 GHz |
| 2 | 5725-5850 MHz | 71.950-72.075 GHz |
| 3 | 5725-5850 MHz | 72.125-72.250 GHz |
| . | . | . |
| . | . | . |
| . | . | . |
| 18 | 5725-5850 MHz | 74.750-74.875 GHz |
| 19 | 5725-5850 MHz | 74.925-75.050 GHz |
| 20 | 5725-5850 MHz | 75.100-75.225 GHz |

Figure 5B:
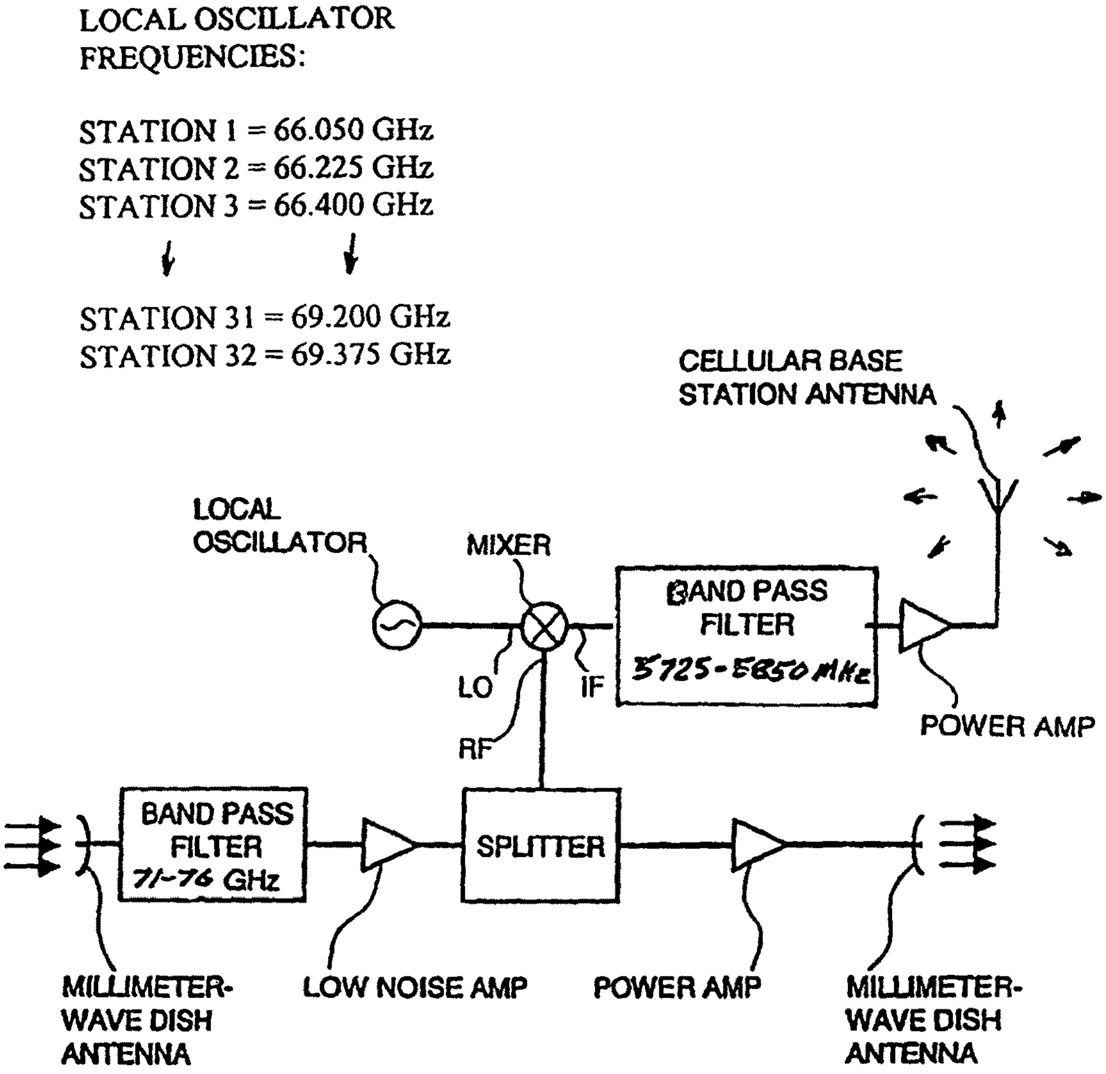
FIG. 5B demonstrates down conversion from trunk line frequencies to wireless internet access frequencies.

FIG. 5B shows a block diagram of a system that receives millimeter-wave signals from the fiber point of presence and converts them to the wireless internet band for transmission by a wireless base station. Each wireless internet base station picks off the signals in its 125 MHz slice of the 71-76 GHz spectrum, down-converts this slice to the wireless internet band, and broadcasts it. The 71-76 GHz band is also retransmitted to the next base station in the chain. Each base station has a local oscillator set to a slightly different frequency, which determines the 125 MHz wide slot (in the 71-76 GHz band) that is assigned to that base station.

WiFi Hot Spots

Figure 6A:
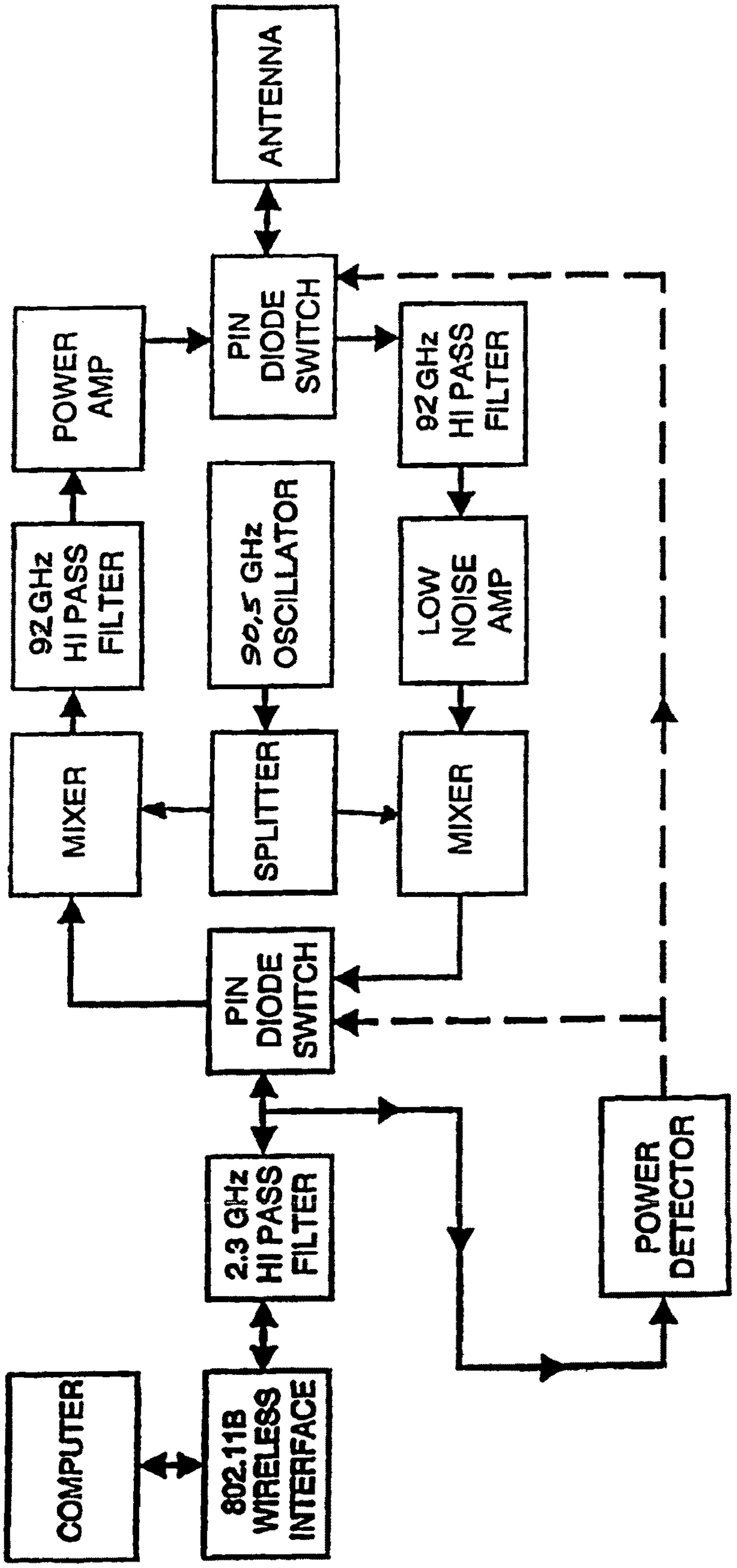
FIG. 6A is a block diagram showing the principal components of a prepackaged wireless internet access station designed for roof-top installation.

In addition to serving wireless internet or WiMax base stations through a millimeter wave trunk line, individual wireless hotspots (WiFi hotspots) based on the IEEE 802.11 standard can be served by a millimeter wave backhaul link as described in FIG. 6A. In this figure, reference is made to frequencies in the 92-94 GHz millimeter wave band (which is part of the 92-94 and 94.1-95 GHz bands allocated by the FCC for point to point millimeter wave links). A computer connected to an 802.11b wireless interface operating in the 2.4-2.4835 GHz ISM band has its communications up-converted to or down-converted from the 92-94 GHz millimeter wave band by combination with a 90.5 GHz local oscillator. Time division duplexing (via a PIN Diode Switch) is used to separate signals to be transmitted by the computer from signals to be received by the computer (or more generally the WiFi hotspot). Signals in the 92-94 GHz millimeter wave band are transmitted by and received by the Antenna in the right of the diagram, and again send and receive are separated at different time slots by a PIN diode switch. Hot Spots such as the one described in FIG. 6A could also be served by trunk line systems operating within the 71 to 76 GHz and 81 to 86 GHz bands described in detail above. The reader should understand that detailed description of lens based systems described in this application have been designed for the 71 to 86 GHz bands to meet FCC requirements. If operation in the 92-95 band is contemplated the designs would need to be modified as needed to fit within the FCC guidelines. Specifically, the FCC requires narrower beams for systems operating in the 92-95 band as compared to the lower frequency bands.

Digital Transmission

In the preferred embodiments for the use of a millimeter wave trunk line serving a series of cellular base stations or wireless computer networking (or internet) base stations discussed thus far, the architecture has been discussed in terms of an analog system wherein low frequency radio or microwave bands associated with each base station were up-converted to specific slots in a high frequency millimeter wave band for transmission back to a central office or to the internet backbone. Different base stations were allocated different slots in the high frequency millimeter wave spectrum. One millimeter wave band (say 71-76 GHz in the case of wireless internet access) was used for transmission from the central network to the base stations, and a different band (say 81-86 GHz in the case of wireless internet access) was used for transmission from the base stations back to the central network. In an alternate preferred embodiment, all of the information received from the low frequency microwave broadcast systems is digitized at the base stations, and combined in a digital fashion for backhaul transmission across the high frequency millimeter wave links. Similarly, the information destined for users of the wireless network is sent from the central office or internet point of presence in a digital format across the high frequency millimeter wave links, and then separated out at each appropriate base station and converted to the appropriate analog waveforms for transmission by the low frequency microwave systems. Standard digital switches and routers can be used for the combination and separation of the digital data, based on user destination addresses embedded in individual data packets.

Figure 6B:
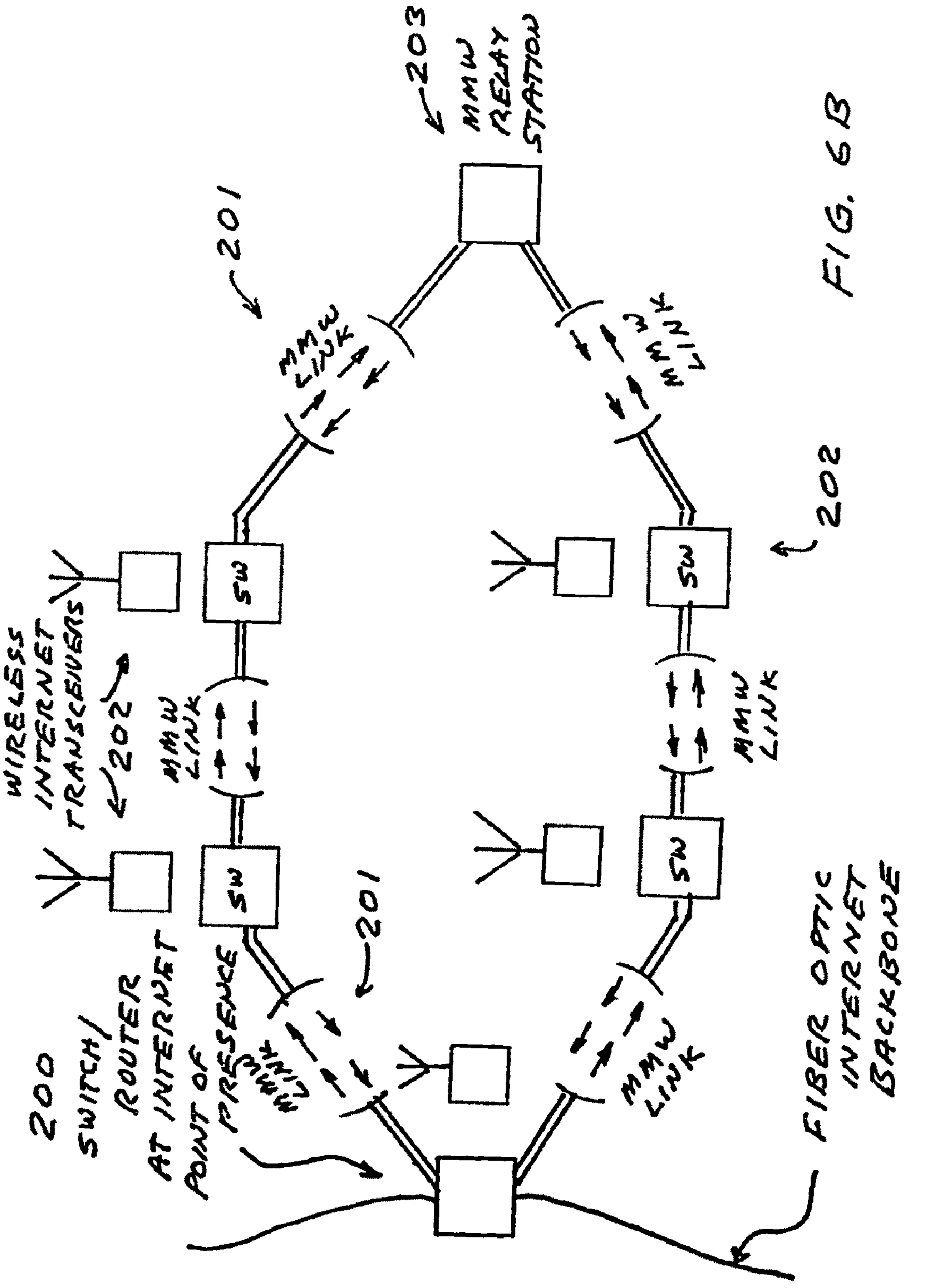
FIG. 6B is a sketch of a millimeter wave trunk line connecting Internet access base stations using digital communication.

FIG. 6B, which is analogous to FIG. 3B, shows a series of wireless internet access point transceivers operating as base stations 202, each with its own coverage area for wireless users, communicating to and from the fiber optic internet backbone at a fiber point of presence 200, using high frequency millimeter wave links. In FIG. 6B, the information on the millimeter wave links is digitized, and transmitted as indicated at 201 using some digital protocol such as gigabit Ethernet at 1.25 Gb/s. User communications are separated from the internet backbone using a standard digital switch or router, and then separated from the millimeter wave links using a switch or router at the appropriate destination base station. Similarly, user communications are combined with other traffic on the millimeter wave links using switches or routers at each base station. In this way, the millimeter wave links serve in exactly the same way as fiber optic links which carry digital information, except that the millimeter wave links are wireless. In addition, the millimeter wave links and wireless internet access point transceivers can be arranged in a loop or other network configuration to provide redundancy in case of failure at one of the nodes or links. (That is, there are two or more paths that communication traffic can take between the fiber optic backbone and the wireless internet base stations, so that if one path is unavailable, the traffic can be routed along an alternate path).

Figure 6C:
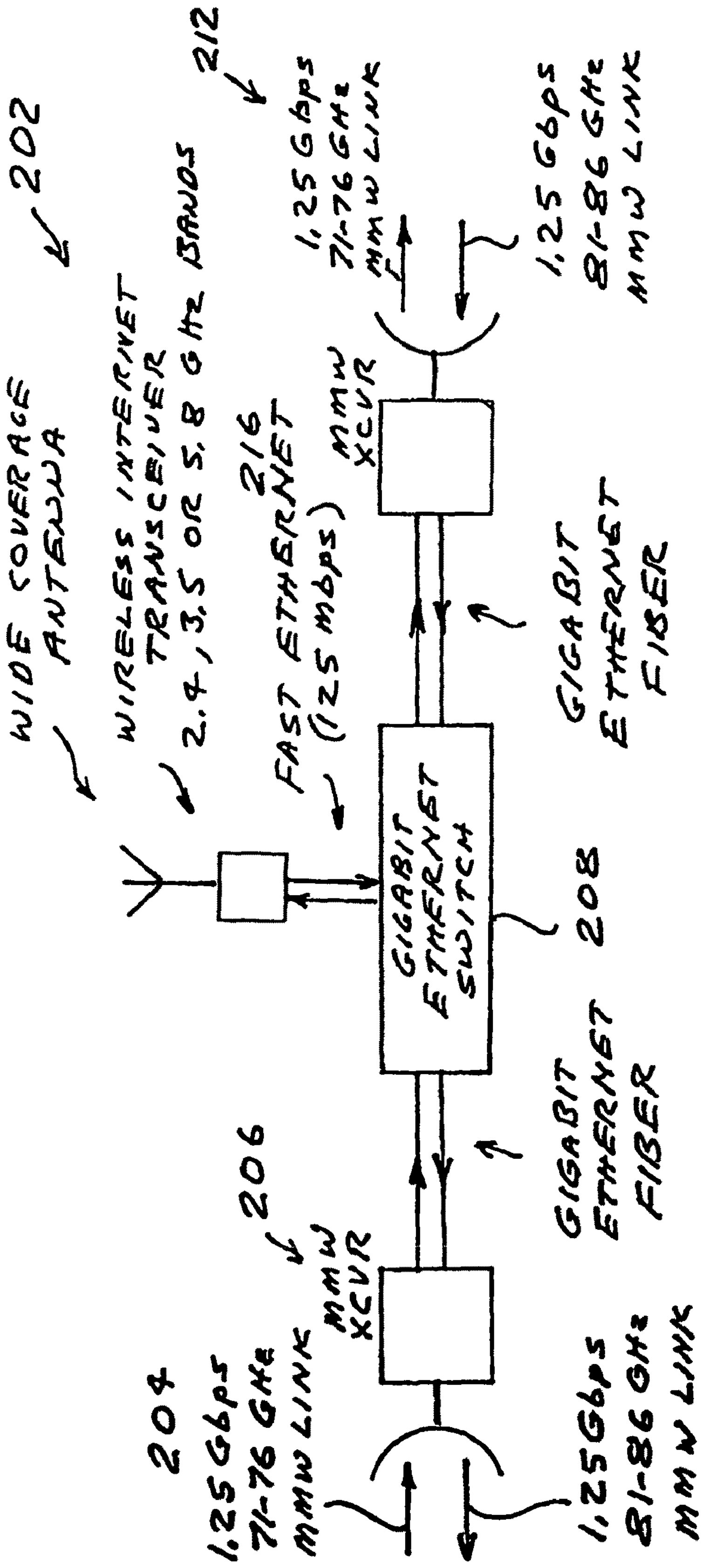
FIG. 6C demonstrates switching of digital wireless Internet traffic on to and off of a trunk line.

FIG. 6C shows details of how the equipment at a base station 202 according to FIG. 6B could be arranged. Information from one millimeter wave link is incident from the left at 204 in the 71-76 GHz millimeter wave band operating at a digital data rate of 1.25 Gbps according to the gigabit Ethernet standard. Millimeter wave transceiver 206 converts the information on the millimeter wave link (which may be modulated by many means including on-off keying, phase shift keying such as BPSK or QPSK, etc.) to digital base band information. Gigabit Ethernet switch 208 separates out any packets from the digital base band data stream which have destinations with wireless users served by that base station, and transfers them via a fast Ethernet link at 125 Mbps to wireless Internet transceiver 210 for broadcast (after appropriate modulation format conversion) from the wireless internet transceiver operating in one of several possible bands such as 2.4, 3.5 or 5.8 GHz. At the same time, information from a second millimeter wave link is incident from the right as shown at 212 in the 81-86 GHz millimeter wave band on a second gigabit Ethernet data stream. This information is converted by the millimeter wave transceiver 210 on the right to base band, and is also processed by the gigabit Ethernet switch 208 to separate out any traffic with a user destination at that base station. User communications which are received by the wireless internet transceiver 214 from users within its geographical coverage area are digitized and transferred to the gigabit Ethernet switch through a 125 Mbps fast Ethernet link 216. The switch then combines this user communications data with data which was received by the switch on the gigabit Ethernet ports from either the left or right transceiver, and sends this out for transmission by either the millimeter wave transceiver on the left or the millimeter wave transceiver on the right, depending on the data packet destination address and the current routing table being used. Data is transmitted along the link to the left at 1.25 Gbps using the 81-86 GHz millimeter wave band, and data is transmitted along the link to the right at 1.25 Gbps using the 71-76 GHz millimeter wave band. While the equipment residing at the base station has been described here as consisting of separate elements (which might currently be purchased from different vendors) it should be appreciated that these separate elements can be combined into a single piece of equipment (or a smaller subset of equipment than that which is shown).

Figure 6D:
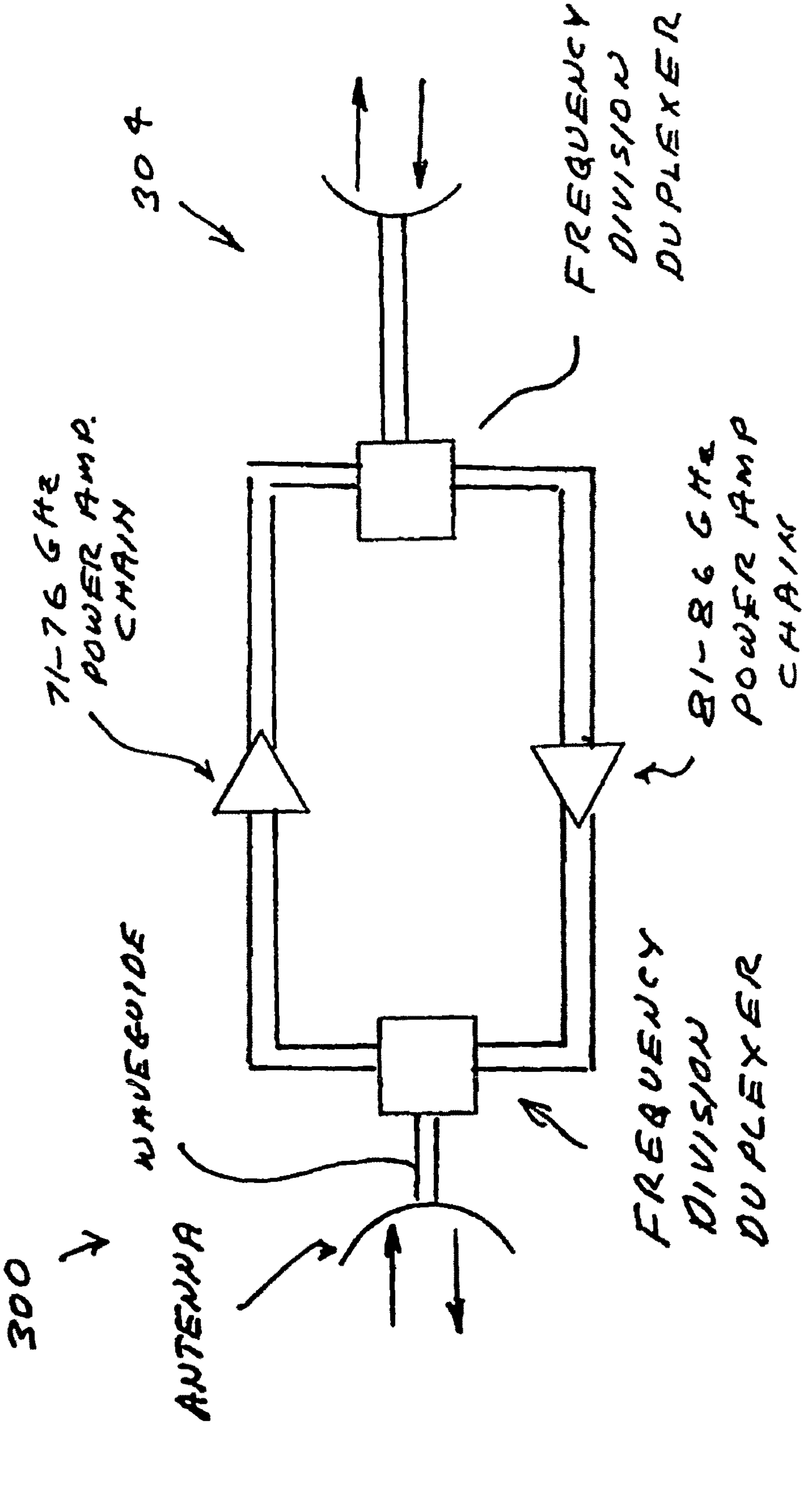
FIG. 6D demonstrates use of a millimeter wave amplifier in a trunk line relay station.
Figure 6E:
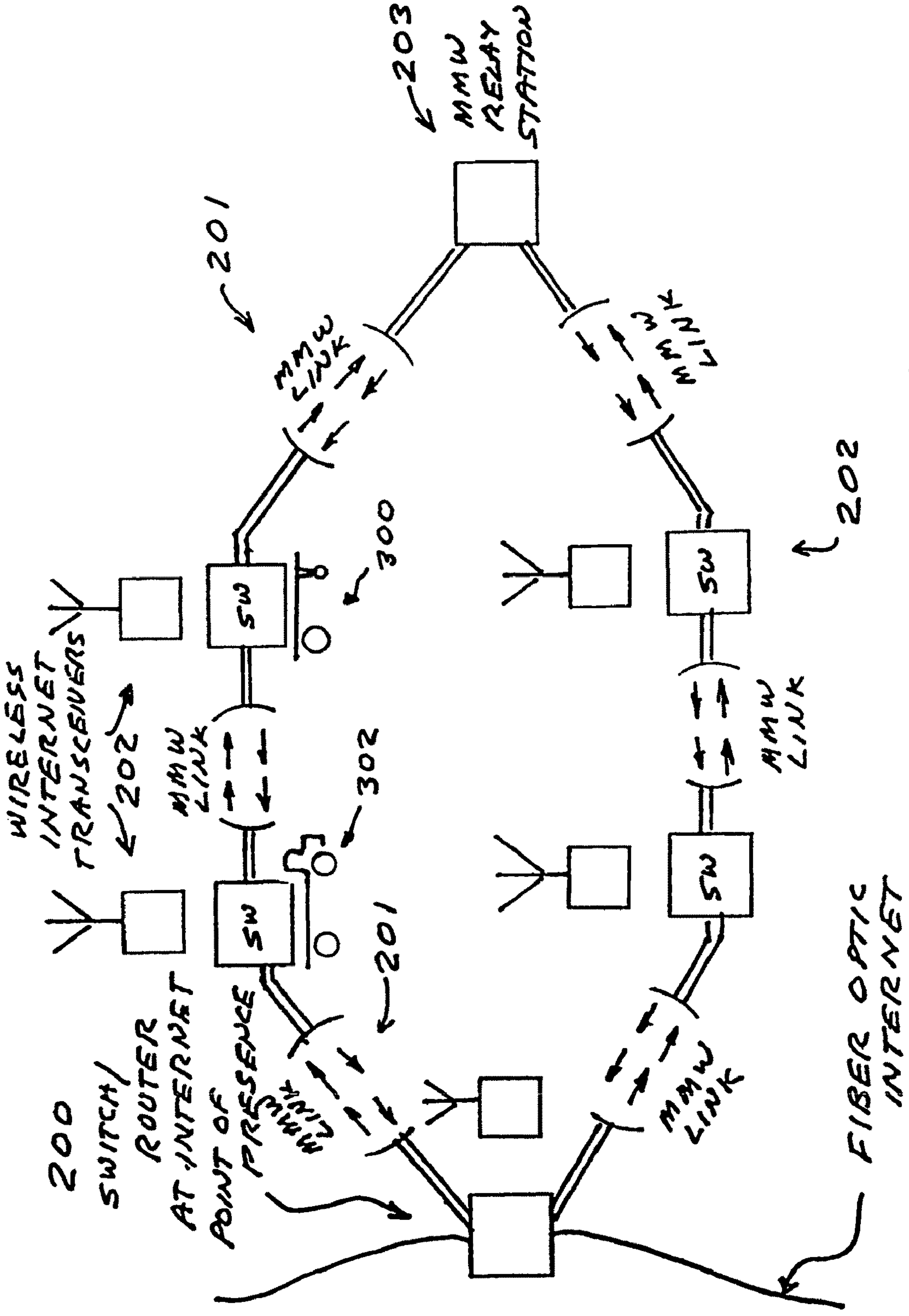
FIG. 6E is the same as FIG. 6B except one of the base stations is mounted on a truck trailer and another base station is mounted on the bed of a flat-bed truck.

FIG. 6B also shows a millimeter wave relay station 203 (at the right) where there is no switch or wireless internet access base station or transceiver. Such a relay station is useful in cases where there is no line of sight link path between two base stations, or where the distance between two base stations is too far to support a millimeter wave link with the desired high weather availability. FIG. 6D shows a possible configuration for such a relay station which does not require any signal down-conversion or up-conversion for operation. In this example, a millimeter wave link operating at 71-76 GHz is incident from the left on an antenna 300. The signal from the antenna is separated by a frequency duplex diplexer capable of separating out frequencies in the 71-76 GHz band from frequencies in the 81-86 GHz band. The incident signal is then amplified by a power amplifier chain 302, which might be a series of amplifiers including a low noise amplifier, a high gain amplifier, and a power amplifier. The amplified signal is then transferred to a second antenna on the right via a second frequency division diplexer for transmission along a millimeter wave link on the right. Note that the data modulation on the signal has not been accessed or converted, but that the power has been amplified and redirected towards another station. Similarly, millimeter wave radiation received by antenna 304 on the right in the 81-86 GHz band is separated by a frequency division diplexer, amplified, and then directed via a frequency division diplexer to the antenna 300 on the left for transmission along the left millimeter wave link. (Although gigabit Ethernet protocol was specified in the examples described above, other protocols for digital transmission, such as OC-24 (1.244 Gbps) or OC-48 (2.488 Gbps) may be used.)

Mobile Base Stations

An important advantage of these millimeter wave systems over prior art systems is that base stations can be installed on mobile vehicles such as truck trailers or on flat-bed trucks that can be moved to base-station sites and be in operation within a few hours or at the most a few days. (Applicants refer to these base stations where all or a large portion of the base station equipment is mounted on a vehicle such as a truck or truck trailer as "mobile base stations", recognizing that when in actual use the mobile base stations will be stationary.) Use of these mobile base stations permits complete new networks to be placed in service within a few days or weeks. In some cases these mobile base stations may be a substantially permanent installation or these mobile stations could provide temporary service until more permanent base stations are constructed. These more permanent base stations could be base stations provided with cable or fiber optic trunk lines or the more permanent facilities could include millimeter wave links that are ground mounted or are mounted on existing buildings or other non-mobile facilities. In fact a "mobile" base station such as a base station mounted on a truck trailer could be converted to a "permanent" base station merely by removing the communication equipment from the trailer and mounting it permanently on structures attached directly or indirectly to the ground.

Figure 3C:
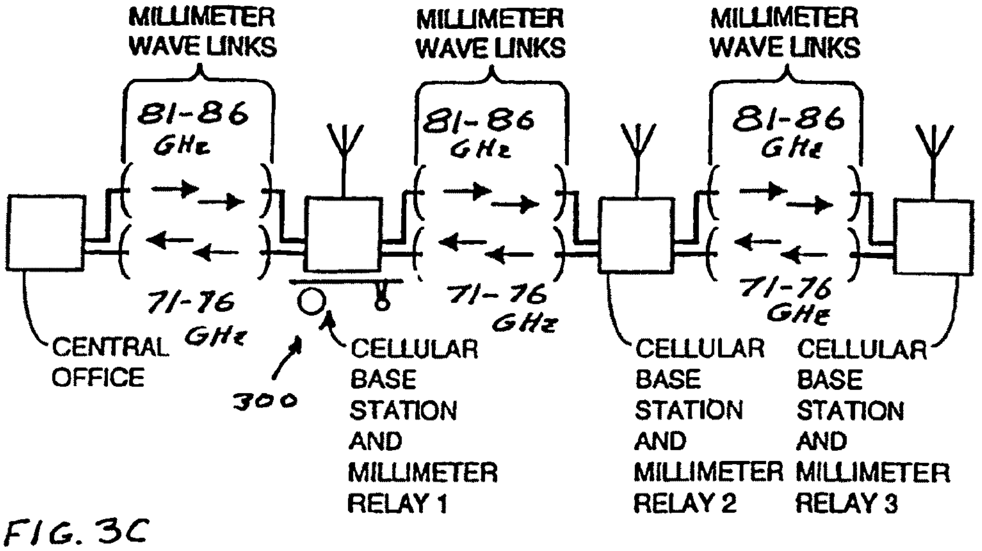
FIG. 3C is the same as FIG. 3A except one of the base stations is mounted on a truck trailer and another base station is mounted on the bed of a flat-bed truck.
Figure 3D:
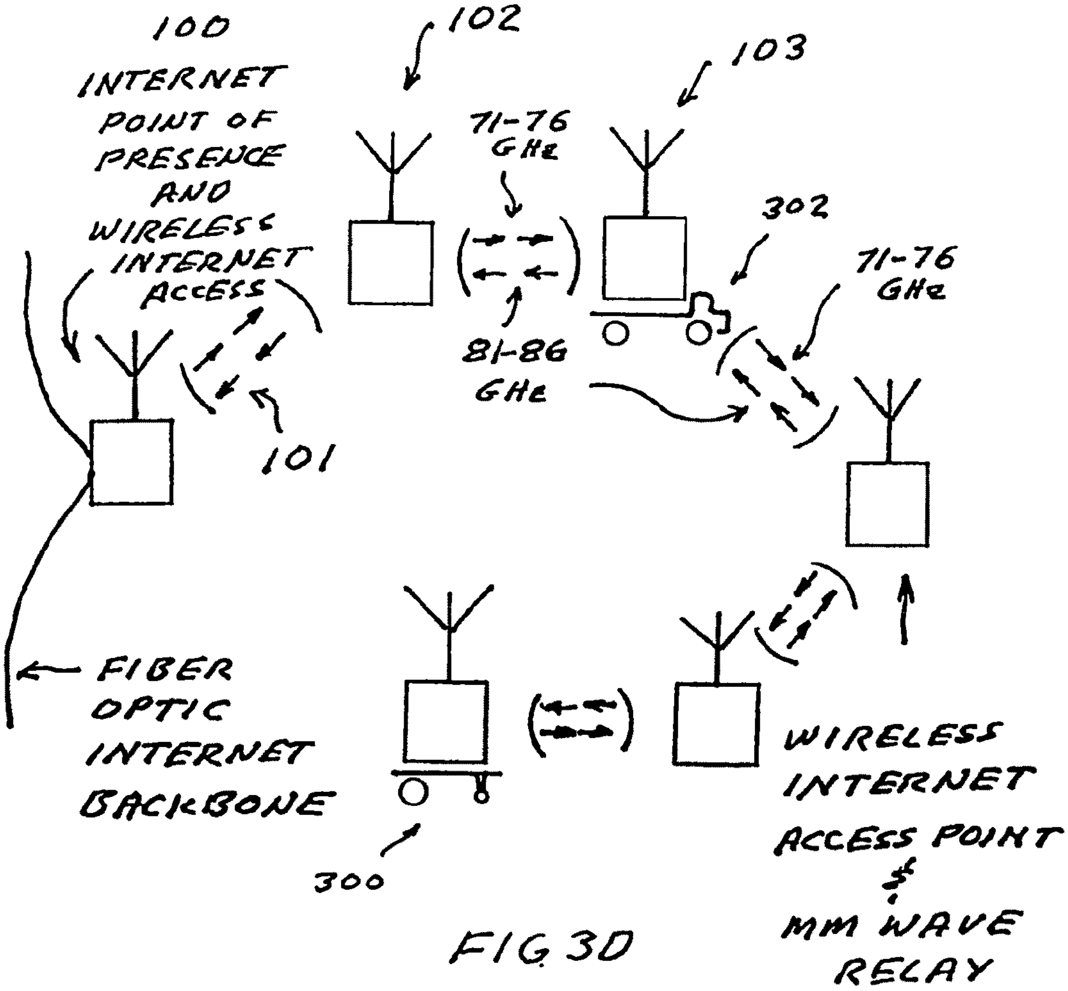
FIG. 3D is the same as FIG. 3B except one of the base stations is mounted on a truck trailer and another base station is mounted on the bed of a flat-bed truck.

These mobile base stations could also be utilized as a temporary replacement for base stations damaged or destroyed by events such as a flood or fire. They could also be utilized temporarily while an existing bases station is being upgraded. FIGS. 3C, 3D and 6G are the same as FIGS. 3A, 3B and 6B, respectively. In each case conventionally mounted cellular base stations are replaced by mobile mounted base stations 300 and 302. Stations 300 are trailer mounted and stations 302 are mounted on the bed of a flat bed truck.

QPSK Millimeter Wave Radio Transceiver

Figure 7:
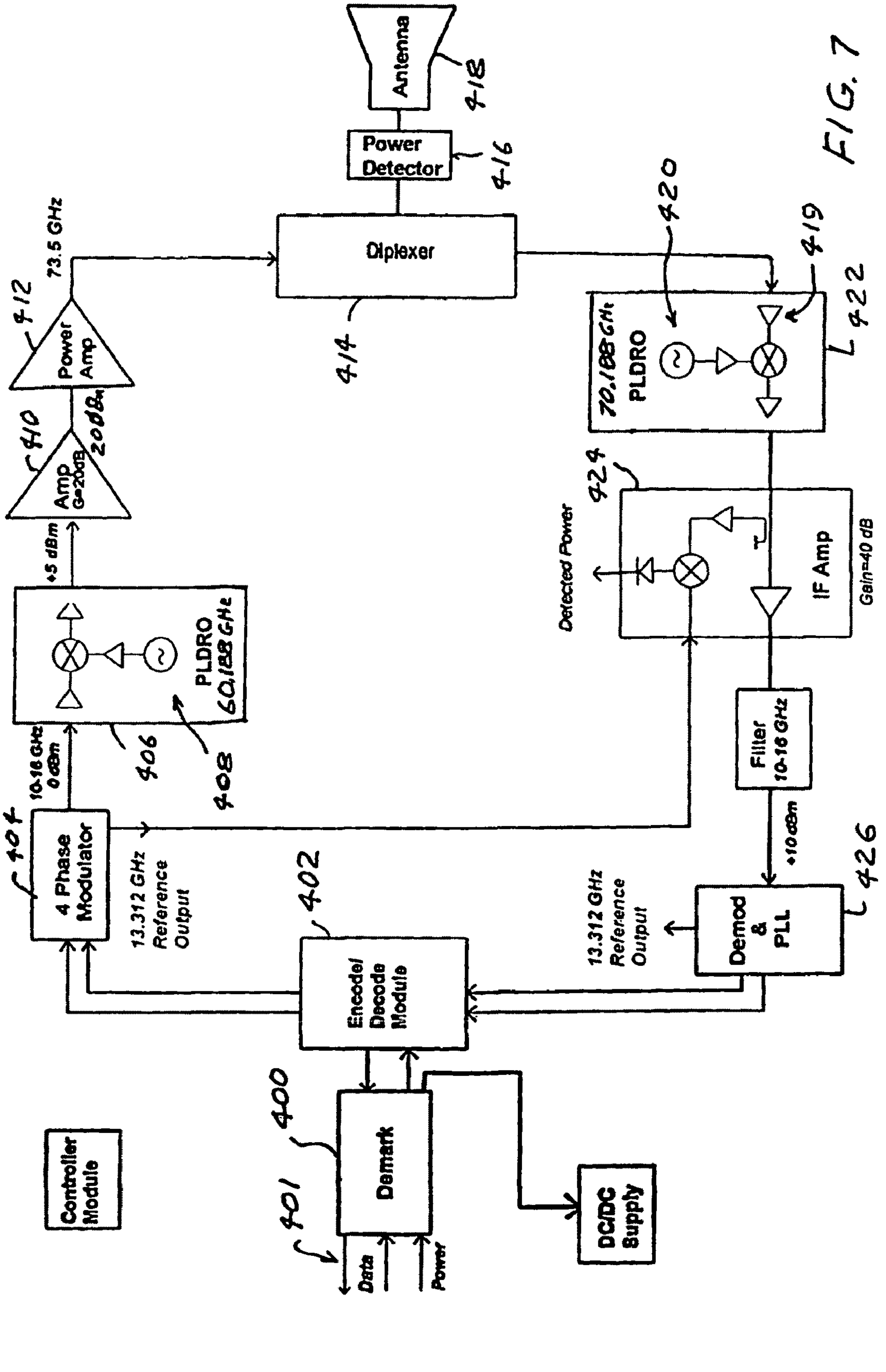
FIG. 7 is a schematic diagram of a millimeter wave transmitter and receiver in an additional preferred embodiment of the present invention.

FIG. 7 shows a preferred embodiment for a millimeter wave radio transceiver being built by Applicants which operates simultaneously from a single antenna in the 71-76 GHz band and the 81-86 GHz band on the same polarization. In the embodiment shown, the transceiver transmits radiation centered at the 73.5 GHz millimeter wave frequency, and receives radiation centered at the 83.5 GHz millimeter wave frequency. A paired transceiver which communicates with the transceiver shown receives at 73.5 GHz and transmits at 83.5 GHz. All of the transceiver modules are identical for the two paired transceivers, except that the local oscillator and mixer module frequencies are reversed. This transceiver is compatible with phase shift keyed modulation, and amplifiers and high power amplifiers which can operate near saturation.

Digital data at a data rate of 2.488 Gbps (corresponding to fiber optic communications standard OC-48) is incident through a fiber optic cable as indicated at 401 to the Demark (Demarcation) box 400 on the left. Power is also supplied to this box, either at 48 V DC, or 110 or 220 V AC. This power is first converted to 48 V DC, and then the power is converted to low voltage DC power of various values such as +/−5V and +/−12 V by DC to DC power supplies for use by the various modules in the transceiver. The incoming 2.488 Gbps data then enters the Encoder module 402 where it is encoded in a format appropriate for QPSK modulation. If no error correction or auxiliary channel bits are desired, the incoming data is demultiplexed (on alternate bits) into two data streams at 1.244 Gbps. If error correction, encryption, or the addition of auxiliary channel bits is desired, these are added at this point resulting in two data streams at a slightly higher data rate. Bits from each data stream are then combined to form a dibit, and subsequent dibits are compared (essentially through a 2 bit subtraction process) to form an I and Q data stream which differentially encodes the incoming data. The I and Q data streams (at 1.244 Gbps if extra bits have not been added) drive a 4 phase modulator 404 which changes the phase of a 13.312 GHz oscillator signal. The output of the 4 phase modulator is a signal at 13.312 GHz as indicated at 404 which has its phase changed through 4 different possible phase values separated by 90 degrees at a baud rate of 1.244 Gbps. The amount of rotation from the previous state depends on the incoming digital dibit. (A 00 corresponds to no phase change, 01 to 90 degree phase change, 10 to 180 degree phase change and 11 to 270 degree phase change). The 13.312 GHz modulated oscillator signal is then combined with a 60.188 GHz local oscillator signal in mixer 406 to form a signal centered at 73.5 GHz. As indicated at 408 the local oscillator utilizes a phase locked dielectric resonant oscillator (PLDRO) signal at 10.031 which has been multiplied in frequency by a factor of 6. The 73.5 GHz signal is then amplified to a power near 20 dBm (100 mW) by a first amplifier module 410, and then (optionally) amplified to a power near 2 W by a power amplifier 412. The amplified signal enters a frequency division diplexer 414 which routes the 73.5 GHz frequency band to an output waveguide, past a power detector 416 (to measure the transit power) and then to a parabolic 2 foot diameter antenna 418 for transmission along a line of sight through free space to the paired transceiver.

At the same time, incoming millimeter wave radiation centered at 83.5 GHz transmitted by a paired transceiver (not shown) is received at the two foot parabolic antenna 418 and passes through the waveguide to the frequency division diplexer. The 83.5 GHz radiation is passed by the diplexer to the lower arm of the diagram in FIG. 14. It is then amplified by low noise amplifier 419 and mixed in mixer 422 with the signal from a local oscillator 420 operating at 70.188 GHz. The 70.188 GHz frequency is generated by multiplying a signal from a phase locked dielectric resonance oscillator (PLDRO) locked to a frequency of 11.698 GHz by a factor of 6 (through a times 2 and a times 3 multiplier). The output of mixer 422 is a signal centered at 13.312 GHz which is filtered and amplified by the IF Amplifier module 424. The receive signal strength is also measured at this stage. After further amplification and filtering, the incoming 13.312 GHz signal enters the demodulation and phase locked loop module 426 where an I and Q digital data stream are extracted. The I and Q data streams at 1.244 Gbaud then enter the decoder module where the 2.488 Gbps data stream sent from the paired transceiver is reconstructed. Decoder 402 basically computes the difference between sequential pairs of I and Q data, which corresponds to the dibits originally encoded at the paired transceiver. (The I and Q are related to the phase of the incoming signal with some ambiguity, but the difference in phase is known. If the phase has changed by 0 degrees, then the transmitted dibit was 00, 90 degrees corresponds to 01, 180 degrees corresponds to 10 and 270 degrees corresponds to 11). The decoded dibits are then remultiplexed into a 2.488 Gbps data stream for transmission to the demark box 400 and then through fiber optic cable 401 to the user.

Backup Microwave Transceiver Pair

During severe weather conditions data transmission quality will deteriorate at millimeter wave frequencies. Therefore, in preferred embodiments of the present invention a backup communication link is provided which automatically goes into action whenever a predetermined drop-off in quality transmission is detected. A preferred backup system is a microwave transceiver pair operating in the 10.7-11.7 GHz band. This frequency band is already allocated by the FCC for fixed point-to-point operation. FCC service rules parcel the band into channels of 40-MHz maximum bandwidth, limiting the maximum data rate for digital transmissions to 45 Mbps full duplex. Transceivers offering this data rate within this band are available: off-the-shelf from vendors such as Western Multiplex Corporation (Models Lynx DS-3, Tsunami 100

BaseT), and DMC Stratex Networks (Model DXR700 and Altium 155). The digital radios are licensed under FCC Part 101 regulations. The microwave antennas are Cassegrain dish antennas of 24-inch diameter. At this diameter, the half-power beamwidth of the dish antenna is 3.0 degrees, and the full-power beamwidth is 7.4 degrees, so the risk of interference is higher than for MMW antennas. To compensate this, the FCC allocates twelve separate transmit and twelve separate receive channels for spectrum coordination within the 10.7-11.7 GHz band. Sensing of a millimeter wave link failure and switching to redundant microwave channel is an existing automated feature of the network routing switching hardware available off-the-shelf from vendors such as Cisco, Foundry Networks and Juniper Networks.

The reader should understand that in many installations the provision of a backup system will not be justified from a cost-benefit analysis depending on factors such as costs, distance between transmitters, quality of service expected and the willingness of customers to pay for continuing service in the worse weather conditions.

Coarse and Fine Pointing

Pointing a high-gain antenna requires coarse and fine positioning. Coarse positioning can be accomplished initially using a visual sight such as a bore-sighted rifle scope or laser pointer. The antenna is locked in its final coarse position prior to fine-tuning. The fine adjustment is performed with the remote transmitter turned on. A power meter connected to the receiver is monitored for maximum power as the fine positioner is adjusted and locked down.

At gain levels above 50 dB, wind loading and tower or building flexure can cause an unacceptable level of beam wander. A flimsy antenna mount could not only result in loss of service to a wireless customer; it could inadvertently cause interference with other licensed beam paths. In order to maintain transmission only within a specific "pipe," some method for electronic beam steering may be required.

Other Wireless Techniques

Transmit power may be generated with a Gunn diode source, an injection-locked amplifier or a MMW tube source resonating at the chosen carrier frequency or at any sub-harmonic of that frequency. Source power can be amplitude, frequency or phase modulated using a PIN switch, a mixer or a bi-phase or continuous phase modulator. Modulation can take the form of simple bi-state AM modulation, or can involve more than two symbol states; e.g. using quantized amplitude modulation (QAM). Double-sideband (DSB), single-sideband (SSB) or vestigial sideband (VSB) techniques can be used to pass, suppress or reduce one AM side-band and thereby affect bandwidth efficiency. Phase or frequency modulation schemes can also be used, including simple FM, bi-phase or quadrature phase-shift keying (QPSK) or 8 PSK or higher. Transmission with a full or suppressed carrier can be used. Digital source modulation can be performed at any date rate in bits per second up to eight times the modulation bandwidth in Hertz, using suitable symbol transmission schemes. Analog modulation can also be performed. A monolithic or discrete-component power amplifier can be incorporated after the modulator to boost the output power. Linear or circular polarization can be used in any combination with carrier frequencies to provide polarization and frequency diversity between transmitter and receiver channels. A pair of dishes can be used instead of a single dish to provide spatial diversity in a single transceiver as well.

The MMW Gunn diode and MMW amplifier can be made on indium phosphide, gallium arsenide, or metamorphic InP-on-GaAs. The MMW amplifier can be eliminated completely for short-range links. The mixer/downconverter can be made on a monolithic integrated circuit or fabricated from discrete mixer diodes on doped silicon, gallium arsenide, or indium phosphide. The phase lock loop can use a microprocessor-controlled quadrature (I/Q) comparator or a scanning filter. The detector can be fabricated on silicon or gallium arsenide, or can comprise a heterostructure diode using indium antimonide.

The backup transceivers can use alternative bands 5.9-6.9 GHz, 17.7-19.7 GHz, or 21.2-23.6 GHz; all of which are covered under FCC Part 101 licensing regulations. The antennas can be Cassegrainian, offset or prime focus dishes, or flat panel slot array antennas, of any size appropriate to achieve suitable gain.

Prefabricated Wireless Internet Base Station

In preferred embodiments prefabricated base stations are provided for quick and easy installation on commercial building roof-tops. All of the components of the base station as described above are pre-assembled in the prefabricated station. These components include the low frequency wireless transceiver for communication with users and the millimeter wave transceiver for operation as a part of the trunk line as described above.

Temporary, Emergency and Military Applications

In preferred embodiments all components of the base stations described above are mounted on trucks that can provide emergency wireless telephone networks, wireless computer network and wireless Internet access. These truck mounted systems can also be used for temporary service to a region prior to and during the installation of fiber optic service to the region. Truck mounted systems can also be used by the military to provide wireless communication in battlefield situations.

While the above description contains many specifications, the reader should not construe these as a limitation on the scope of the invention, but merely as exemplifications of preferred embodiments thereof. The present invention is especially useful in those locations where fiber optics communication is not available and the distances between communications sites are less than about 10 km but longer than the distances that could be reasonably served with free space laser communication devices. Ranges of about 0.5 km to 2 km are ideal for the application of the present invention. However, space or in regions with mostly clear weather the system could provide good service to distances of 5 km or more. Accordingly, the reader is requested to determine the scope of the invention by the appended claims and their legal equivalents, and not by the examples given above.

What is claimed is:

1. A lens-based millimeter wave transceiver for use in wireless communication systems operating in the E-band spectrum consistent with the FCC rules regulating the 71-76 GHz and 81-86 GHz bands said transceiver comprising:

A) a single lens adapted for transmission of millimeter radiation to form communication beams in one band of either a band of about 71-76 GHz or a band of 81-86 GHz and for collection and focusing of millimeter wave radiation from communication beams in the other of the two bands, B) a feed horn adapted to broadcast millimeter radiation through said single lens and to collect incoming millimeter wave radiation collected and focused by said single lens, C) a millimeter wave diplexer adapted to separate incoming and outgoing millimeter wave radiation;

wherein said transceiver is adapted to produce outgoing beams with a minimum 3 dB divergence angle of 1.2 degrees, a minimum antenna gain of G=43 dBi, side lobe reduction between 1.2 degrees and 5 degrees of G-28, and side lobe reduction of 35 dB between 5 and 10 degrees off axis.

2. A lens-based millimeter wave transceiver for use in wireless communication systems operating in the E-band spectrum consistent with the FCC rules regulating the 71-76 GHz and 81-86 GHz bands said transceiver comprising:

A) a single lens adapted for transmission of millimeter radiation to form communication beams in one band of either a band of about 71-76 GHz or a band of 81-86 GHz and for collection and focusing of millimeter wave radiation from communication beams in the other of the two bands, B) a feed horn adapted to broadcast millimeter radiation through said single lens and to collect incoming millimeter wave radiation collected and focused by said single lens, C) a millimeter wave diplexer adapted to separate incoming and outgoing millimeter wave radiation;

wherein said transceiver is adapted to be a component of a communications system providing wireless communication for a plurality of cellular base stations, said system comprising:

A) at least one connecting station comprising at least one millimeter wave wireless transceiver in communication with a fiber optic or high-speed cable communication network and adapted to communicate at millimeter wave frequencies higher than 60 GHz with another millimeter wave transceiver at least one of said cellular base stations;

B) a plurality of cellular base stations, each of said base stations serving a communication cell and each of said base stations comprising: 1) at least one low frequency wireless transceiver for communicating with a plurality of users within said communication cell at a radio frequency lower than 6 GHz; 2) a data transfer means for transferring data communicated through said at least one low frequency transceiver to said at least one millimeter wave wireless transceiver and for transferring data communicated through said at least one millimeter wave wireless transceiver to said at least one low frequency wireless transceiver.

3. The transceiver as in claim 2 wherein at least one of said cellular base stations is a mobile base station.

4. The system as in claim 3 wherein the at least one low frequency transceiver and the at least one millimeter wave transceiver is mounted on a truck trailer.

5. The system as in claim 2 wherein said system is a part of a telephone system.

6. The system as in claim 2 wherein said system is a part of an Internet system.

7. The system as in claim 2 wherein said system is a part of a computer network.

8. The system as in claim 2 and further comprising a backup communication adapted to automatically go into action whenever a predetermined drop-off in quality transmission is detected.

* * * * *